United States Patent
Turk et al.

(10) Patent No.: US 8,903,870 B2
(45) Date of Patent: Dec. 2, 2014

(54) SYSTEM FOR MANAGING RISK IN EMPLOYEE TRAVEL

(75) Inventors: Douglas R. Turk, Santa Monica, CA (US); Christopher Holt, Long Aston (GB); Justin Priestley, Loxley (GB); Ian Nunn, Willingham (GB)

(73) Assignee: Aon Global Risk Research Limited, Hamilton (BM)

( * ) Notice: Subject to any disclaimer, the term of this patent is extended or adjusted under 35 U.S.C. 154(b) by 0 days.

(21) Appl. No.: 13/337,005

(22) Filed: Dec. 23, 2011

(65) Prior Publication Data

US 2013/0166607 A1   Jun. 27, 2013

(51) Int. Cl.
*G06F 17/30* (2006.01)
*G06Q 10/04* (2012.01)

(52) U.S. Cl.
CPC ........................... *G06Q 10/04* (2013.01)
USPC ............................................ 707/803

(58) Field of Classification Search
CPC ... G06Q 10/0635; G06Q 10/04; G06Q 50/14; G06Q 50/30
USPC .................. 707/802, 803, 999.001, 999, 1
See application file for complete search history.

(56) References Cited

U.S. PATENT DOCUMENTS

| | | | |
|---|---|---|---|
| 6,603,405 B2 | 8/2003 | Smith | |
| 7,026,928 B1 * | 4/2006 | Lane | 340/539.13 |
| 7,312,712 B1 * | 12/2007 | Worrall et al. | 340/573.4 |
| 7,343,306 B1 | 3/2008 | Bates et al. | |
| 8,115,592 B2 | 2/2012 | Spence | |
| 8,468,244 B2 | 6/2013 | Redlich et al. | |
| 8,611,927 B2 | 12/2013 | Root et al. | |
| 2002/0107927 A1 * | 8/2002 | Gallant | 709/206 |
| 2003/0134645 A1 | 7/2003 | Stern et al. | |
| 2003/0196097 A1 | 10/2003 | Korosec et al. | |
| 2003/0225687 A1 * | 12/2003 | Lawrence | 705/38 |
| 2005/0181775 A1 | 8/2005 | Rideout et al. | |
| 2007/0088507 A1 | 4/2007 | Haberlen et al. | |
| 2007/0169109 A1 * | 7/2007 | Neswal | 717/174 |
| 2007/0240227 A1 * | 10/2007 | Rickman et al. | 726/27 |
| 2008/0027749 A1 * | 1/2008 | Meyer et al. | 705/1 |
| 2008/0281848 A1 | 11/2008 | Corbett | |
| 2009/0040238 A1 | 2/2009 | Ito et al. | |
| 2009/0270080 A1 | 10/2009 | Mathew et al. | |
| 2010/0121563 A1 * | 5/2010 | Chavez et al. | 701/201 |
| 2011/0213706 A1 | 9/2011 | Joshi et al. | |
| 2011/0225114 A1 | 9/2011 | Gotthardt | |

(Continued)

OTHER PUBLICATIONS

Amendment filed Jun. 3, 2014 in U.S. Appl. No. 13/337,001.

(Continued)

*Primary Examiner* — Shiow-Jy Fan
(74) *Attorney, Agent, or Firm* — Oblon, Spivak, McClelland, Maier & Neustadt, L.L.P.

(57) ABSTRACT

A system for managing risk in employee travel may track a location of users of the travel risk management system during travel. Travel itinerary information for a user may be input into the travel risk management system, including user identification information, travel date information and geographic location information for travel destinations. During the travel period, the system may communicate with a portable computing device to determine the user's actual location, and update the stored travel itinerary information if the user's actual location is different than the user's expected location. The system may transmit a location request message to the user's portable computing device, or a mobile application may cause the portable computing device to transmit the user's location without prompting.

16 Claims, 21 Drawing Sheets

(56) References Cited

U.S. PATENT DOCUMENTS

2012/0123821 A1* 5/2012 Rickman .............. 705/7.28
2012/0331304 A1 12/2012 She et al.

OTHER PUBLICATIONS

Non-final Office Action received Dec. 3, 2013 in U.S. Appl. No. 13/337,001.
Non-Final Office Action received Feb. 25, 2014 in U.S. Appl. No. 13/337,007.
Amendment after Notice of Allowance (Rule 312) filed on Nov. 8, 2013 in U.S. Appl. No. 13/337,008.
Final Rejection mailed on Jul. 24, 2014 in U.S. Appl. No. 13/337,001
Amendment and Response filed on Aug. 25, 2014 in U.S. Appl. No. 13/337,007.

* cited by examiner

| Edit | Select | Company ID | Company Name | Total Activation Codes | Used | Available | % Used | Company Status |
|---|---|---|---|---|---|---|---|---|
| | | 2 | AonHewitt | 1122 | 0 | 606 | 0 | ● Active |
| | | 1 | Apple Test | 144 | 2 | 18 | 0 | ● Active |
| | | 5 | Bernie Company 1 | 20 | 0 | 10 | 0 | ● Active |
| | | 3 | Chicago Inc Test | 500 | 0 | 1 | 0 | ● Active |
| | | 4 | Mike Kelly Company 1 | 10 | 0 | 8 | 0 | ● Active |

Edit Company: AonHewitt

Edit Company: AonHewitt
- Company Name: AonHewitt
- First Name: mark
- Last Name: anthony
- Street: 105th Avenue
- City: NY
- State: NY
- Zip:: 8986544443
- Phone Number: 8088644848299
- Email: mark@gmail.com
- Create New Package: ☑
- Total Activation Codes:
- Activation Code Effective Date:
- Activation Code Renewal Date:

Update  Cancel

SYSTEM FOR MANAGING RISK IN EMPLOYEE TRAVEL

TECHNICAL FIELD

This disclosure relates generally to risk management systems and, in particular, to a travel risk management system for providing information regarding domestic risk and risk in foreign countries, and for assisting travelers upon the occurrence of a risk management event.

BACKGROUND

With the expansion and sophistication of commerce and technology, companies located in a particular country or countries are able to conduct business throughout the world. This business diversity includes entry into established and stable countries and into developing countries were emerging markets present profitable opportunities for conducting business. These diverse countries and markets present equally diverse cultures, social and economic conditions and climatic differences. Consequently, each country or market present different challenges and risks to which business travelers may be exposed and for which the travelers may not be aware or prepared.

Many aspects are present in the travel risk landscape in both developed and underdeveloped countries. Emerging markets present numerous safety and medical challenges. As countries develop, widening social and economic divisions within the countries can feed increases in violent crimes, including kidnapping for ransom and extortion. Terrorism continues to pose threats, with international travelers being within the target group for terrorist attacks. The nature of these crimes can result in serious injuries and fatalities, long term mental health problems that may result from kidnapping or terrorism, loss of property and interruption of business activities.

In addition to medical incidents arising out of criminal activity, other medical risks are present in international travel. Injuries and fatalities may be caused due to road and traffic conditions, and other deficiencies in the national infrastructure. Exposure of individuals to foreign agents can result in the contraction of diseases to which the individuals are not immune. Plague and famine may also impact individuals and business operations. Similarly, environmental conditions and events such as earthquakes, hurricanes, tsunamis and floods can arise with minimal warning and cause devastation and loss of human life and property.

When sending employees out to work in international destinations, organizations may have a duty of care to ensure, as best as possible, the safety of its employees from these and other travel-related risks. The organization may have a responsibility to perform extensive risk assessments when expanding into emerging markets, and to monitor changing threat levels where the employees are exposed to risk and disseminate updated information in a timely and effective manner. Prior to travel, it may be desirable and prudent to prepare personnel traveling to countries having different risk profiles than their routine environments. These preparations may include educating the personnel on cultural awareness of issues relating to local religions and tribal cultures, male-female relations, meeting protocols and the like, on general travel safety practices, and on general and immediate safety and whether issues. The organization may also establish procedures to react to travel-related incidents ranging from routine issues such as lost baggage and travel documents to extraordinary circumstances such as catastrophic weather events and acts of violence perpetrated against organizational personnel.

Currently, risk assessments, pre-travel preparation and education, and travel-related incident response have been handled using traditional technology and knowledge transfer techniques. The outcome of risk assessments may be memorialized in reports or presentations that may then be conveyed to prospective business travelers at training seminars or meetings with travel consultants. Developing situations increasing the risk in a particular country may be communicated to traveling personnel via telephone or electronic mail messages, or, in some cases, the traveler may be left to refer to local media or the Internet for the latest information on conditions within the country in which they are traveling. These delays in the delivery of the relevant risk information to an organization's traveling personnel may further increase the risk of being impacted by existing or developing conditions in the foreign country placed upon the personnel by the organization. For these reasons, a need exists for an improved system for travel risk management wherein organizations may be able to monitor the conditions in foreign countries and the locations of their personnel in those countries, and to communicate information to the personnel in a timely manner for avoiding adverse impacts of developing high risk situations and for reacting quickly to travel-related incidents in order to mitigate the adverse impact on the organization's personnel and the disruption of the organization's business.

SUMMARY OF THE DISCLOSURE

In one aspect of the present disclosure, the invention is directed to a method for tracking a location of users of a travel risk management system during travel. The method may include inputting travel itinerary information for a user of the travel risk management system into a user travel database of the system, wherein the travel itinerary information includes user identification information, travel date information for the time period in which the user is traveling, and geographic location information for at least one destination of the user during the travel time period. The method may further include, during the travel time period, communicating with a portable computing device of the user to determine an actual location of the user, comparing the actual location of the user to an expected location of the user determined based on the stored travel itinerary information, and updating the stored travel itinerary information with the actual location of the user in response to determining that the actual location of the user is different than the expected location of the user from the travel itinerary information.

In another aspect of the present disclosure, the invention is directed to a method for determining an actual location of a user of a travel risk management system. The method may include transmitting a location request message from an application server of the travel risk management system to a portable computing device of the user, receiving a location response message from the user's portable computing device at the application server, wherein the location response message contains user identification information and the actual location of the user, and updating a user location of the user stored in a user location database of the travel risk management system with the actual location of the user from the location response message.

In a further aspect of the present disclosure, the invention is directed to a computer readable medium with computer executable instructions for a portable computing device application of a travel risk management system, wherein a portable computing device on which the portable computing device application may be installed includes an input device and a memory. The computer executable instructions may include instructions for receiving user activation information input at the input device of the portable computing device, wherein the user activation information includes user identification information and an activation code, storing the user activation information in the memory of the portable computing device, determining a current location of the portable computing device in response to the occurrence of a triggering event at the portable computing device, formatting a current location message containing the user identification information and the current location of the portable computing device, and transmitting the location message from the portable computing device to an application server of the travel risk management system.

Additional aspects of the invention are defined by the claims of this patent.

BRIEF DESCRIPTION OF THE DRAWINGS

FIG. 20 is an overview page for an administrative application of the system of FIG. 1;

FIG. 21 is a portion of the overview screen of FIG. 20 enlarged and with an add new company window displayed;

FIG. 22 is a portion of the overview screen of FIG. 20 enlarged and with an edit company information window displayed;

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning Finally, unless a claim element is defined by reciting the word "means" and a function without the recital of any structure, it is not intended that the scope of any claim element be interpreted based on the application of 35 U.S.C. §112, sixth paragraph.

Figure 1:
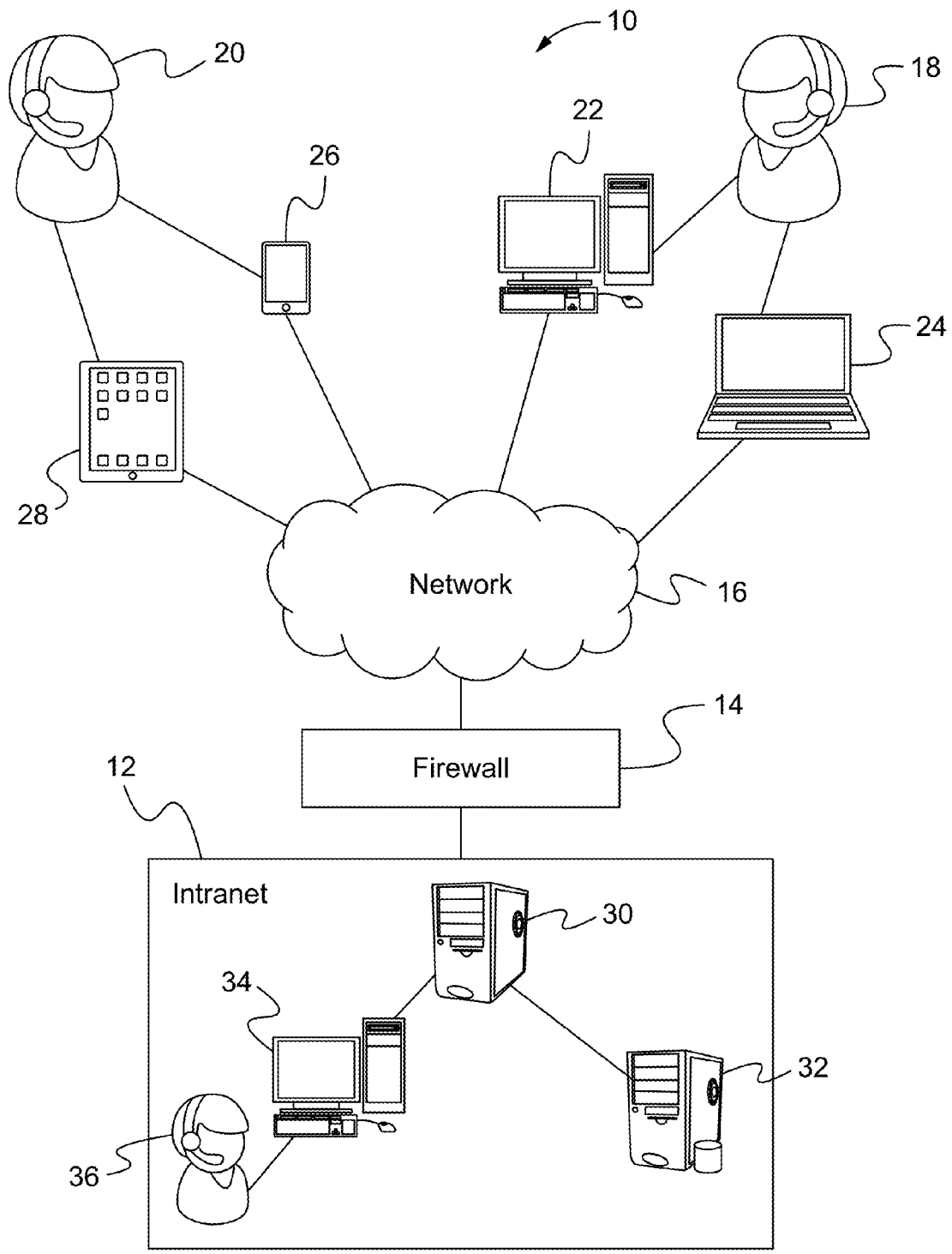
FIG. 1 is a schematic diagram of an employee travel risk management system in accordance with the present disclosure.

FIG. 1 illustrates an embodiment of an employee travel risk management system 10 in accordance with the present disclosure. The travel risk management system 10 may have a centralized repository of information relating to cultural conditions, environmental forecasts and current risk conditions for the countries around the world that is accessible by local and remote users for assistance in planning and conducting travel to foreign countries. The system 10 may be implemented by an organization for the assistance of its employees, or by a provider organization, such as an insurance company, that may provide the information and make it available to its subscribing customers and their employees. In either implementation, the travel risk management system 10 may include a centralized provider intranet 12 hosting the information of the travel risk management system 10 that may be connected via a firewall 14 to a network 16, such as the Internet, to provide connectivity for a plurality of remote users 18, 20 using remote computing devices 22, 24, 26, 28.

The provider intranet 12 may contain the components necessary for the hosting organization to input and store the information related to the travel conditions in the various countries, to process the information as necessary, and to exchange requests and information with the remote users 18, 20 over the network 16. The provider intranet 12 may include a business application server 30 hosting the application programs of the system 10, a database server 32 connected to the business application server 30 and storing the travel condition information, and one or more local workstations 34 providing access for local users 36 to the applications hosted by the server 30 and the information stored in the database server 32. While only a single business application server 30 and a single database server 32 are shown, it should be noted that the functionality of the servers 30, 32 may be implemented in one or more physical servers with functions and date distributed across the servers as appropriate. For example, the business application server 30 may consist of a web application server providing content and processing for web-based applications and a mobile application server for interacting with mobile applications downloaded onto portable computing devices. Moreover, the data of the database server 32 may be distributed across multiple servers and database. Those skilled in the art will understand additional configurations of servers that may fall within the generic business application server 30 and database server 32 illustrated and discussed herein.

The designation of components and users of the system 10 as being "local" or "remote" may be used to refer to the physical proximity or distance between the components as well as a functional relationship of the components to the system 10. For example, a local user 36 may be disposed within the same physical location as the business application server 30 and database server 32 or at a remote location and communicating via the network 16, but may have authorization for accessing and manipulating the data of the database server 32, perform database and application programming and maintenance operations, have administrative access for granting access for remote users 18, 20 of the system and the like. In contrast, the remote users 18, 20 may be granted more limited access to the travel risk information of the system 10 whether they are communicating over the network 16 or from within the location of the servers 30, 32.

Figure 2:
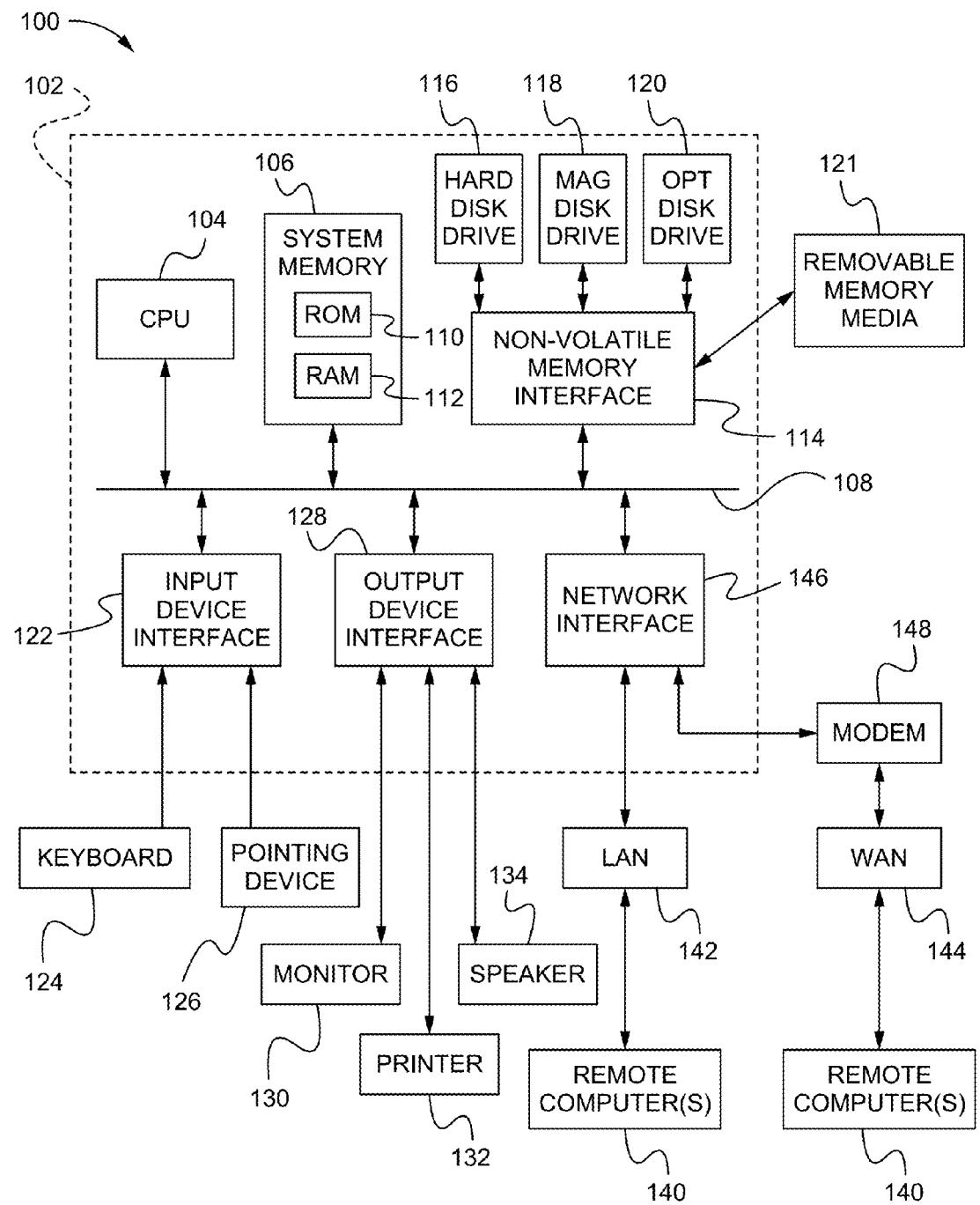
FIG. 2 is a block diagram of a computing workstation that may operate in the system of FIG. 1.

FIG. 2 illustrates an example of a suitable computing system workstation 100 on which various components of the travel risk management system 10 such as the remote computing devices 22, 24, servers 30, 32 and local workstations 34, and the steps of the claimed method and apparatus, may be implemented. Those skilled in the art will understand that the computing workstation 100 is only one example of a suitable computing workstation and is not intended to suggest any limitation as to the composition of the components of the travel risk management system 10 or the scope of use or functionality of the methods or apparatuses of the claims. The computing workstation 100 should not be interpreted as having any dependency or requirement relating to any one or combination of components illustrated in the exemplary workstation 100.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system for implementing the travel risk management system 10, the steps of the claimed methods, and claimed apparatuses may include the components 22, 24, 30, 32, 34 implemented in a general purpose computing device in the form of a computer 102. Components of computer 102 may include, but are not limited to, a central processing unit (CPU) 104, a system memory 106, and a communication bus 108 coupling various system components including the system memory 106 to the CPU 104. The communication bus 108 may be any of several types of bus structures including a memory bus or memory controller, a peripheral bus, and a local bus using any of a variety of bus architectures.

The computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 106 may include computer storage media in the form of volatile and/or nonvolatile memory such as read only memory (ROM) 110 and random access memory (RAM) 112. The ROM 110 may contain the basic routines that help to transfer information between elements within the computer 102, such as during start-up, is typically stored in the ROM 110. The RAM 112 typically contains data and/or program modules that are immediately accessible to and/or presently being operated on by CPU 104. By way of example, and not limitation, the RAM 112 may store the operating system, application programs, other program modules and program data of the computer 102.

The computer 102 may also include other removable/non-removable, volatile/nonvolatile computer storage media. By way of example only, FIG. 2 illustrates the computer 102 including a non-volatile memory interface 114 connected to the communication bus 108 that may facilitate communications and data exchange with removable and/or non-removable computer storage media. Computer storage media connected to the non-volatile memory interface 114 may include a hard disk drive 116 that reads from or writes to non-removable, nonvolatile magnetic media, a magnetic disk drive 118 that reads from or writes to removable, nonvolatile magnetic disks (not shown), and an optical disk drive 120 that reads from or writes to removable, nonvolatile optical disks (not shown) such as CD ROMs or other optical media. Other non-removable computer storage media that can be used in the exemplary operating environment include, but are not limited to, solid state RAM, solid state ROM, SDRAM, and the like, as well as removable memory media 121 such as magnetic tape cassettes, flash memory cards, digital versatile disks, digital video tape, solid state RAM, solid state ROM, SDRAM, and the like. The drives and their associated computer storage media discussed above and illustrated in FIG. 2, provide storage of computer readable instructions, data structures, program modules and other data for the computer 102. For example, the hard disk drive 116 may store all or a portion of the operating system of the computer 102, application programs, other program modules, and program data. Note that these components can either be the same as or different from the operating system, application programs, other program modules, and program data stored in the RAM 112 of the system memory 106.

A user may enter commands and information into the computer 102 through various input devices that may be connected to the CPU 104 through a user input interface 122 that may be coupled to the communication bus 108. Common input device may include a keyboard 124 and pointing device 126, commonly referred to as a mouse, trackball or touch pad. Other input devices (not shown) may include a microphone with accompanying voice recognition software, joystick, game pad, satellite dish, scanner, or the like. These and other input devices may be connected to the CPU 104 by other interfaces or bus structures, such as a parallel port, game port or a universal serial bus (USB). The computer 102 may also include peripheral output devices that may be connected to the CPU 104 by an output interface 128 connected to the communication bus 108. The output devices may include a monitor 130 or other type of video display device such as a CRT display, LCD screen, plasma screen, touchscreen that may have an accompanying stylus, or any other appropriate video display device. In addition to the monitor 130, the computer 102 may also include other peripheral output devices providing visual output of information, such as a printer 132, audio output of information, such as speakers 134, and other devices providing sensory perceptible output of information from the computer 102.

The computer 102 may operate in a networked environment with the other components of the travel risk management system 10 in the same location and, depending on the implementation, in remote locations, using logical connections to one or more remote computers, such as a remote computer 140. The remote computer 140 may be a personal computer, a server, a router, a network PC, a peer device or other common network node, and typically includes many or all of the elements described above relative to the computer 102. The logical connections between the computer 102 and the remote computer 140 depicted in FIG. 2 include a local area network (LAN) 142 and a wide area network (WAN) 144, but may also include other networks. Such networking environments are commonplace in offices, enterprise-wide computer networks, intranets and the Internet.

When used in a LAN networking environment, the computer 102 is connected to the LAN 142 through a network interface 146 connected to the communication bus 108. When used in a WAN networking environment, the computer 102 typically may include a modem 148, or other means for establishing communications over the WAN 144, such as the Internet. The modem 148, which may be internal or external, may be connected to the communication bus 108 via the network interface 146, or other appropriate mechanism. In a networked environment, program modules depicted relative to the computer 102, or portions thereof, may be stored at remote computers 140 and accessed via the LAN 142 or WAN 144 connections. It will be appreciated that the network connections shown are exemplary and other means of establishing a communications link between the computers may be used.

Figure 3:
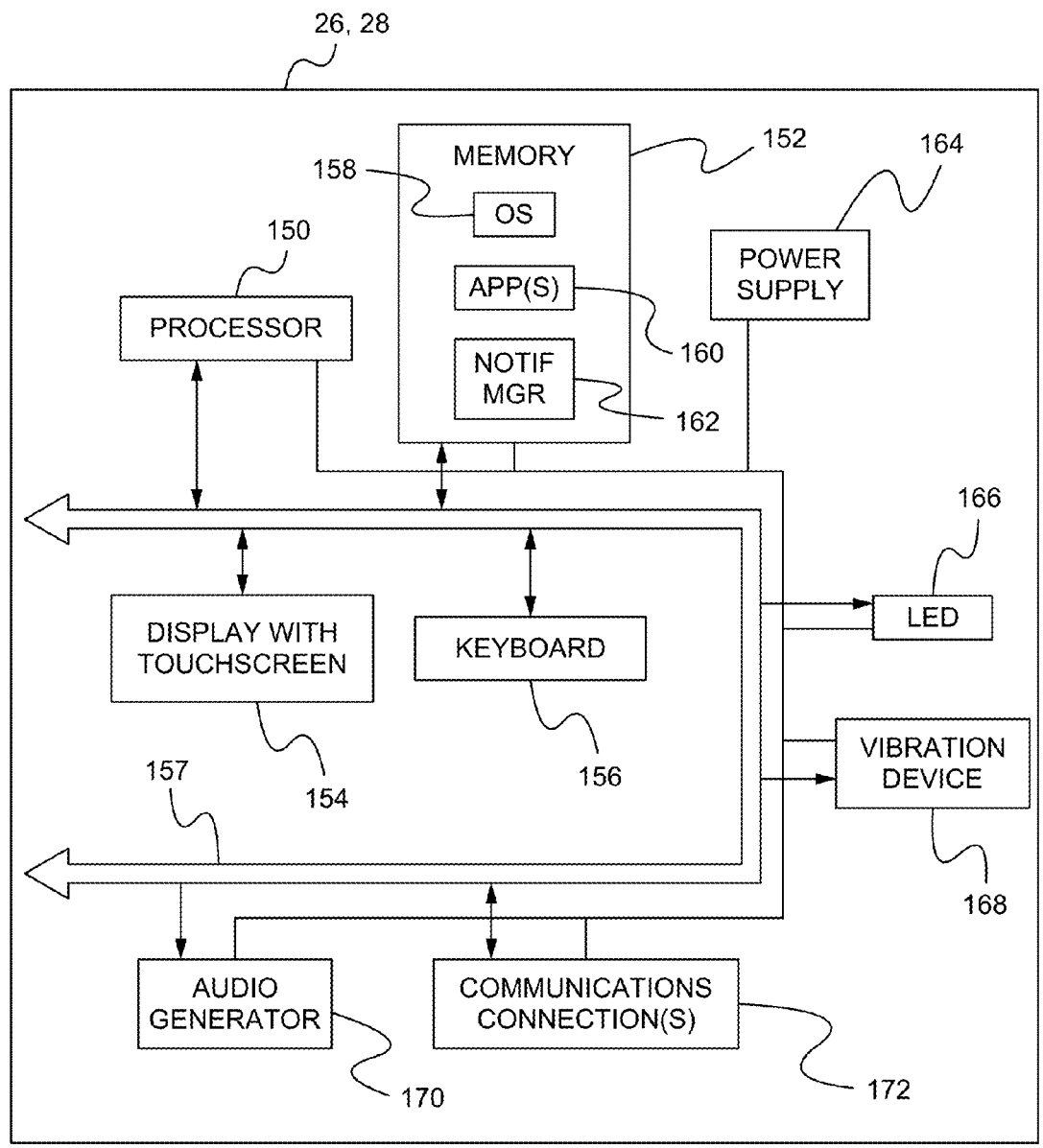
FIG. 3 is a block diagram of a portable computing device that may operate in the system of FIG. 1.
Figure 4:
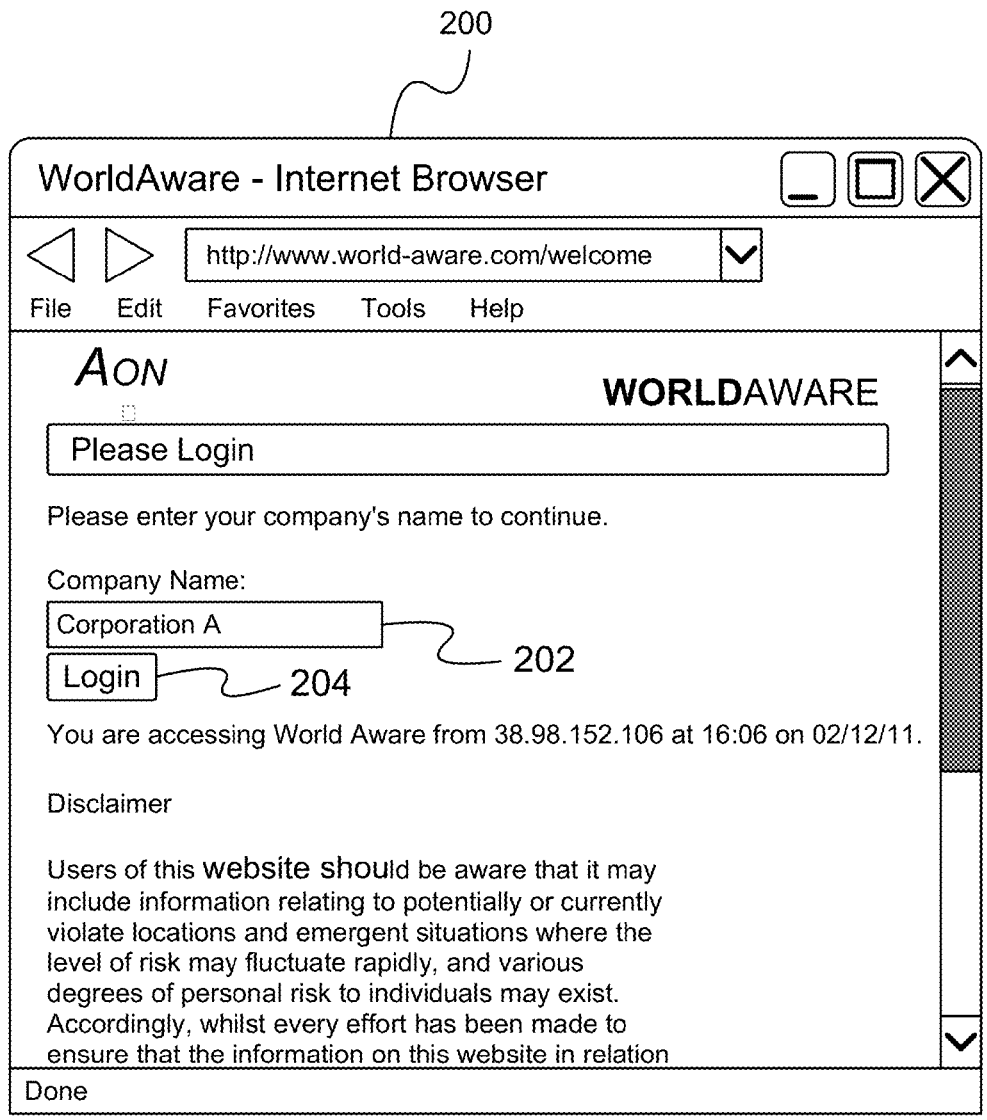
FIG. 4 is a system login page for a website application of the system of FIG. 1.

FIG. 3 shows functional components of an embodiment of the portable computing devices 26, 28 that may be used by the remote users of the travel risk management system 10. The remote computing devices 26, 28 may be PDAs or similar handheld devices, tablet PCs, cellular telephones, smartphones or other device owned by the remote user 20 or provided by the operator of the travel risk management system 10. The portable computing devices 26, 28 may include a processor 150, a memory 152, a display 154, a keyboard 156 or other pushbutton input devices and a communication bus 157 coupling the various system components of the portable computing devices 26, 28. The memory 152 generally includes both volatile memory (e.g., RAM) and non-volatile memory (e.g., ROM, PCMCIA cards, etc.), and may include both non-removable and removable computer storage media such as, where appropriate, those described above or the computer 102, as well as SIM cards for cellular phones. The display 154 may be any portable computing device display, such as an LCD screen, plasma screen, touchscreen with or without stylus or other appropriate display device. An operating system 158 is resident in the memory 152 and executes on the processor 150. The portable computing devices 26, 28 may include an operating system, such as the Windows® CE, Android and iOS operating systems or other operating systems.

One or more application programs 160 are loaded into memory 152 and run on the operating system 158. Examples of applications include email programs, scheduling programs, PIM (personal information management) programs, word processing programs, spreadsheet programs, Internet browser programs, and so forth along with the travel risk management system applications discussed herein. The portable computing devices 26, 28 may also have a notification manager 162 loaded in memory 152, which executes on the processor 150. The notification manager 162 handles notification requests from the applications 160.

The portable computing devices 26, 28 may have a power supply 164, which may be implemented as one or more batteries or other internal power source, such as hydrogen cells. The power supply 164 might further or alternatively include an external power source that overrides or recharges the built-in batteries, such as an AC adapter or a powered docking cradle.

The portable computing devices 26, 28 are also shown with three types of external notification mechanisms: an LED 166, a vibration device 168, and an audio generator 170. These devices are directly coupled to the power supply 164 so that when activated, they remain on for a duration dictated by the notification mechanism 162 even though the portable computing device processor 150 and other components might shut down to conserve battery power. The LED 166 preferably remains on indefinitely until the user takes action. The current versions of the vibration device 168 and audio generator 170 use too much power for today's portable computing device batteries, and so they are configured to turn off when the rest of the system does or at some finite duration after activation.

The portable computing devices 26, 28 may also contain communications connection(s) 172 that allow the devices 26, 28 to communicate with other devices, such as the business application server 30. Communications connection(s) 172 is an example of communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, USB port, a serial port for connecting to an interface cradle, and the like, and wireless media such as acoustic, RF, infrared and other wireless media. The term computer readable media as used herein includes both storage media and communication media.

The steps of the claimed methods and apparatuses are operational with numerous other general purpose or special purpose computing workstations or configurations. Examples of well known computing workstations, environments, and/or configurations that may be suitable for use with the methods or apparatuses of the claims include, but are not limited to, personal computers, server computers, hand-held or laptop devices, implantable devices, multiprocessor systems, microprocessor-based systems, nanotechnology devices and/or systems, set top boxes, programmable consumer electronics, network PCs, minicomputers, mainframe computers, distributed computing environments that include any of the above systems or devices, and the like.

Computer and Web-Based Applications

The travel risk management system 10 functions to store and to provide users with travel and risk information for the various countries around the world. The stored information for each country can include, among other things, general travel related information such as weather forecast, time zone, local currency, other travel related services and information, embassy locations, and cultural information. The stored information may further include more specific information related to travel risks that may exist in the countries and advisory information for assisting with safe travel within the country. When the travel risk management system 10 is implemented by a company for the use of its employees, access to the system 10 may be granted to the employees through the security settings on the employees' login IDs for the company's main information system. When the travel risk management system 10 is implemented by a provider and offered on a subscription basis to companies for use by their employees, access to the system 10 may be granted to the employees of the individual companies via a corporate login ID or individual activation codes as discussed further below wherein the subscribing companies and employees may be granted varying levels of access to the information in the travel risk management system 10.

FIGS. 4-11 illustrate a series of pages that may be provided at a website of the travel risk management system 10 or other graphical interface program provided for subscribing companies and individual employees at remote workstations 22, 24 and local workstations 34 of the system 10. When the website or interface program is initially accessed by a user, a login page 200 and shown in FIG. 4 may be displayed at the workstation 22, 24, 34 at the monitor 130. The login page 200 may include a company identification input box 202 at which the user may enter the company's login identification information, such as the company name or assigned company ID, using an appropriate input device. After entering the company identification information in the box 202, the user may click a login button 204 to cause the company identification information to be transmitted to the business application server 30 for verification and authorization for the user to access information stored in the travel risk management system 10.

Figure 5:
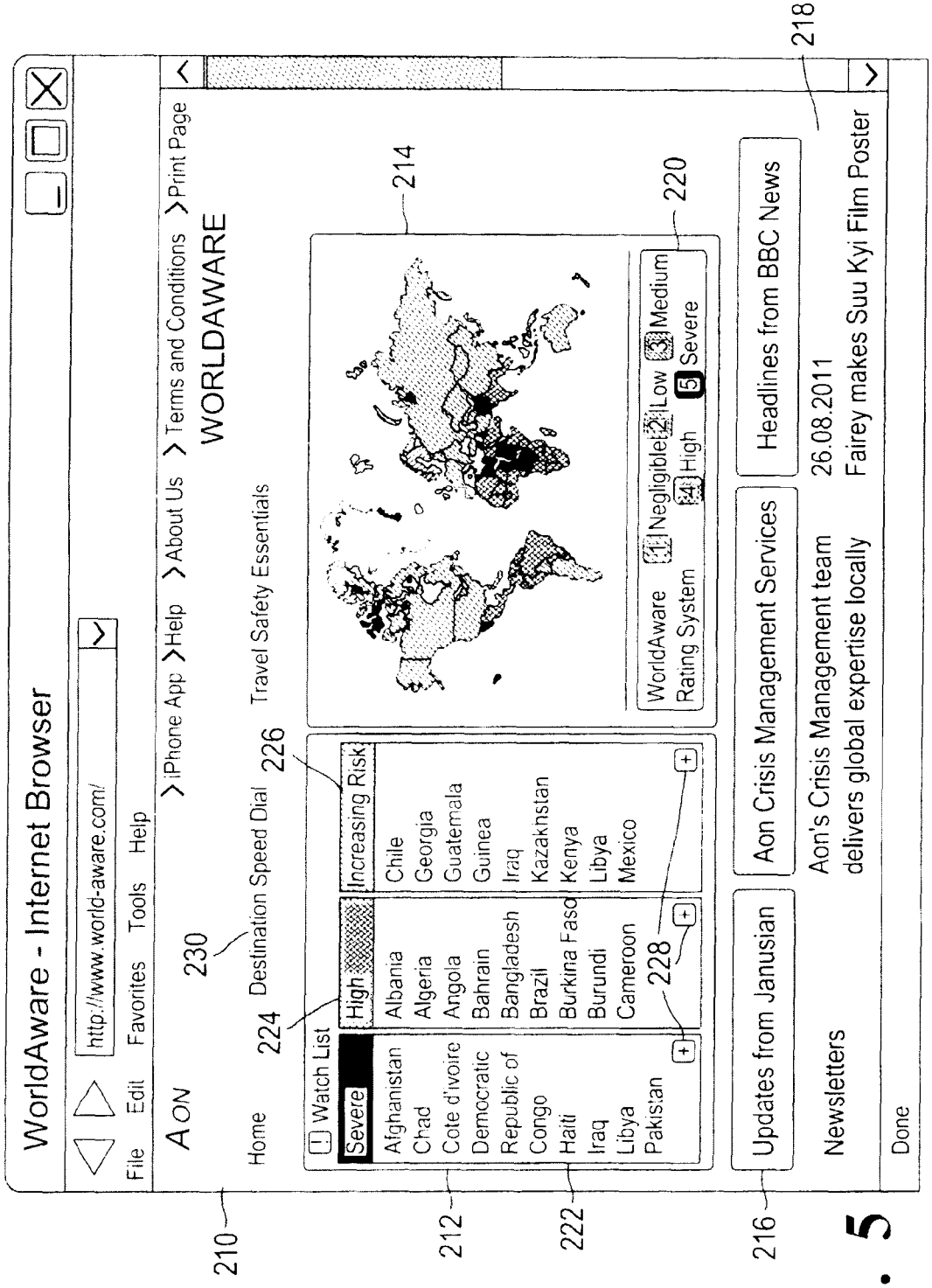
FIG. 5 is a system home page for a website application of the system of FIG. 1.

If the user enters valid customer identification information for a subscribing company, the system 10 may display a system home page 210 as shown in FIG. 5 that may assist the user in navigating to information about a country of interest or to other travel related information stored in the system 10 for access by the users. Information functionality provided on the home page 210 includes a watch list area 212, a world risk map area 214, a newsletter update area 216 with hypertext links to current and earlier issues of newsletters providing travel related information, and a current news area 218 with hypertext links to media outlets such as BBC News for travel related news articles and current events.

The watch list area 212 may allow a user to readily determine countries that are high risk for travel, or that are becoming more risky. For each country, the travel risk management system 10 may store a current risk rating and a risk trend for the country based on an analysis of many factors related to travel safety. These factors can include street crime and serious crime, terrorism, civil unrest, regime instability, state impunity and corruptibility, espionage and armed conflict. The risk rating may also take into account geological and meteorological events and their effects on the country. The factors are weighed and overall risk ratings and risk trends are assigned to each country.

In the illustrated embodiment, an exemplary rating system may include numerical ratings from 1 to 5 as shown in the rating system information area 220 of the home page 210. In the illustrated rating system, a risk rating of 1 may indicate negligible travel risk in the country, 2 may indicate low risk, 3 may indicate medium risk, 4 may indicate high risk and 5 may indicate severe risk. The risk ratings may also be color-coded to facilitate graphical illustration of the risk levels and rapid identification of countries with significant travel risk. Consequently, blue may correspond to negligible risk, green may correspond to low risk, yellow may correspond to medium risk, orange may correspond to high risk, and may correspond to severe risk. The above-described rating system will be used herein for illustration, but those skilled in the art will understand that alternative rating systems may be implemented to assign risk levels along a scale from lowest risk to highest risk and to graphically illustrate assigned risk levels with numeric or alphanumeric characters, icons, color codes and the like, and such systems are contemplated by the inventors as having use in travel risk management systems in accordance with the present disclosure.

A risk trend may also be assigned for each country to provide an indication of whether the risk level for the country is forecast to increase, decrease or remain the same in the foreseeable future. Countries may be assigned an increasing risk trend due to internal factors, such as growing civil unrest, and external factors, such as high-risk situations in adjacent countries that may impact surrounding countries. Decreasing risk trends may be assigned when present conditions are expected to stabilize, such as after the election of a new government. The risk trend may be neutral when the relevant factors generally indicate that the conditions in the country are not expected to change.

The assigned risk level and risk trend may be stored with other country information at the database server 32 and retrieved by the business application server 30 when a user accesses the home page 210. The watch list area 212 of the home page 210 provides the user with a graphical illustration of countries with significant travel risks, or increasing risks for travelers. The watch list area 212 may include a severe risk country list 222, a high-risk country list 224, and an increasing risk country list 226. The severe risk country list 222 and the high-risk country list 224 may include the names of all the countries assigned risk levels of 5 and 4, respectively. The increasing risk country list 226 may include the names of all countries assigned an increasing risk trend. The lists 222, 224, 226 may be dynamically created each time the home page 210 is loaded so that the most up-to-date risk assignments for the corresponding countries are presented where the lists 222, 224, 226 cannot fit within the space provided, the lists 222, 224, 226 may be provided with scroll buttons 228 that may be clicked by the user to scroll up and down the lists 222, 224, 226 to see all of the corresponding country names. Alternative mechanisms for displaying all country names in the lists 222, 224, 226 may be provided such as having a larger window or display area displayed on the page 210 when the cursor is placed over a corresponding one of the lists 222, 224, 226. If the user is interested in viewing additional information for one of countries appearing on one of the list 222, 224, 226 the watch list area 212, the user may click on the corresponding country name to cause a country information page to be displayed as will be described further below.

Figure 6:
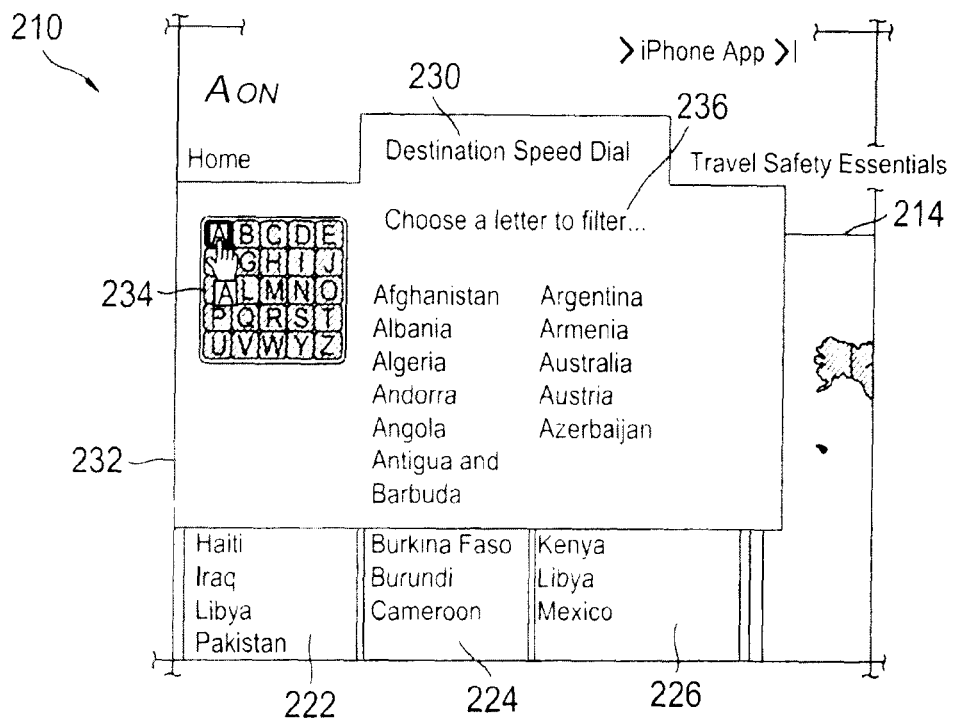
FIG. 6 is a portion of the system home page of FIG. 5 enlarged and with a country search window displayed.

The home page 210 may provide additional mechanisms for assisting the user in navigating to country information pages that are of interest. The home page 210 may include a destination speed dial button 230 that may allow the user to search for a country based on the first letter in the country name. The home page 210 may be configured to detect the cursor being placed over the destination speed dial button 230 and to respond by displaying a country search window 232 as shown in FIG. 6. The country search window 232 may include an alphabetic keypad 234 and a prompt 236 instructing the user to choose a letter with which to filter the country names. When the user moves the cursor and clicks on one of the letters, such as "A," the names of the countries starting with the selected letter are displayed in the country search window 232. If the country of interest is shown in the country search window 232, the user may click on the country name to be directed to the country information page. If the user does not find a country of interest, the user may click on a different letter to display a list of country names beginning with the newly selected letter. When the cursor is moved out of the country search window 232, the window 232 may close so that the home page 210 is redisplayed as shown in FIG. 5.

Figure 7:
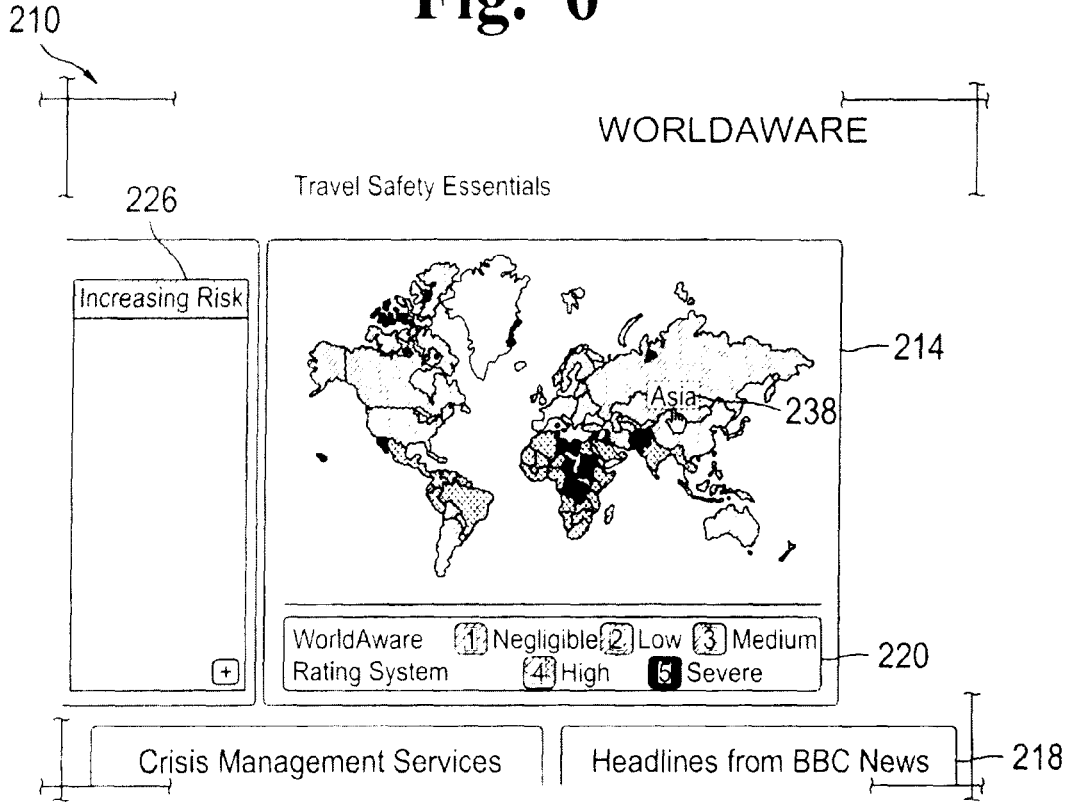
FIG. 7 is an enlarged view of a world risk map area of the system home page of FIG. 5.

An additional mechanism for navigating to information on a country of interest may be provided in the world risk map area 214. When the home page 210 is first displayed, the world risk map area 214 may display a map of showing all countries, with each country being shown in the color corresponding to the assigned risk level. As the cursor is moved over the map area 214, the map area 214 may identify the continent or other geographic grouping over which the cursor is positioned as shown in FIG. 7. When the cursor is within the boundaries of the geographic grouping, the countries within the grouping may change from their individual risk level colors to a uniform color, and a geographic grouping identification window 238 may be displayed, such as the window 238 indicating that the cursor is positioned over a country in Asia. Similar windows 238 may be displayed for North America, South America, Europe, Africa and Oceania, or any other relevant geographic groupings that may be defined in the system 10.

Figure 8:
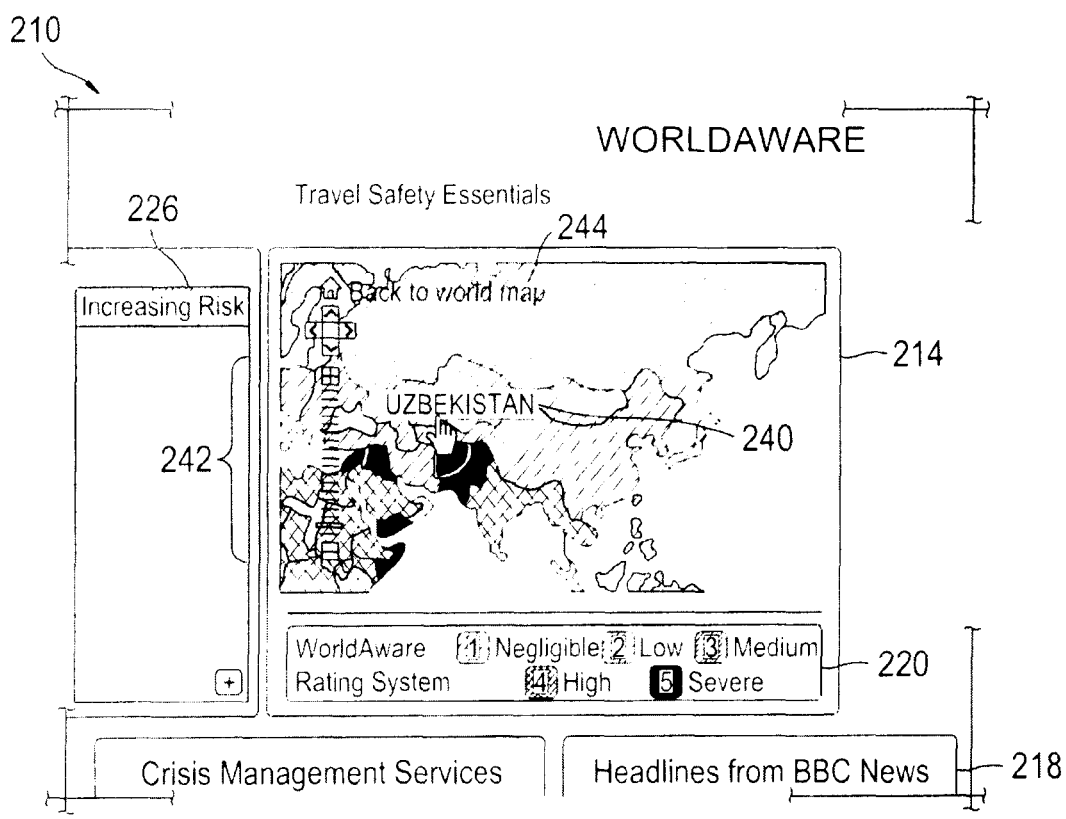
FIG. 8 is the world risk map area of FIG. 7 with the continent of Asia enlarged.

When the cursor is positioned over the geographic grouping of interest to the user in the world risk map area 214, clicking on the location may cause the map area 214 to zoom in on the geographic grouping to show the countries of the grouping greater detail as shown in FIG. 8 and the countries may again be shown in the colors corresponding to their assigned risk levels. After the map area 214 is zoomed in, individual countries may be highlighted as the cursor moves over the map area 214 and is disposed within the boundaries of the country. The color of the country may change from the risk level color to a highlighting color, and a country identification window 240 may be displayed, such as the window 240 indicating that the cursor is positioned over Uzbekistan. If the user is interested in viewing additional information for one of countries shown in the map area 214, the user may click on the country to cause a country information page to be displayed in a similar manner as selecting one of the country names in the watch list area 212. After zooming in on the geographic grouping, the map area 214 may provide additional navigation icons 242 allowing the user to zoom in and out to enlarge or reduce the scale of the map area 214, and to pan up and down and from side to side. The user may also be able to click and drag within the map area 214 to reposition the map and display a desired group of countries. A return button 244 may also be provided with an associated prompt message to allow the user to return the map area 214 to the world map view.

Figure 9:
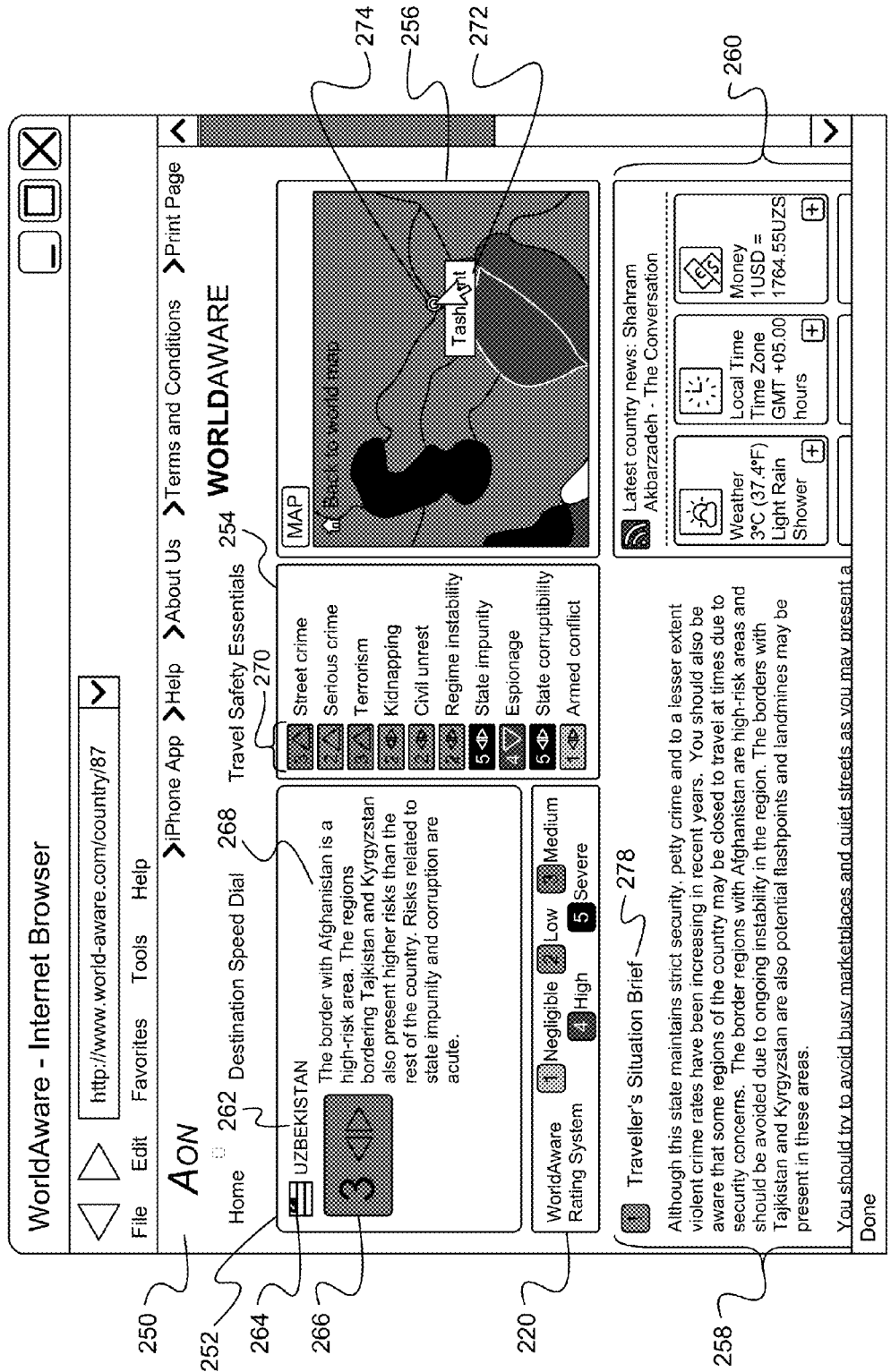
FIG. 9 is a first portion of a country information page for a website application of the system of FIG. 1.

Once the user selects a country of interest from the watch list area 212, the world risk map area 214 or the country search window 232, the selection may cause the business application server 30 to retrieve the information for the selected country from the database server 32 and display the information on a country information page 250 as shown in FIGS. 9-12. Referring to FIG. 9, an exemplary country information page 250 is shown for the country of Uzbekistan. The country information page 250 may include a country overview area 252, the rating system information area 220 reproduced from the home page 210, a risk factor area 254, a country map area 256, a travel information area 258, and a series of country features icons 260 each providing specific information relevant to travel within the country. The country overview area 252 may provide general information regarding the country, the risk level associated with the country, and a brief description of the circumstances causing the assignment of the risk level. The country overview area 252 may include a country name 262, a country flag icon 264, a risk level icon 266 and a risk level description 268. The risk level icon 266 may include the risk level number assigned to the country and be filled in with the corresponding color, and a textual or graphical in vacation of the risk trend assigned to the country. In the illustrated example, the oppositely facing arrows indicate that the risk trend for Uzbekistan is currently neutral such that the current risk level of 3 is expected to be maintained. An upward facing arrow for the risk trend may indicate that the travel risk is increasing for the country, and a downward facing arrow may indicate that the travel risk for the country is decreasing.

Specific reasons for the assigned risk level and risk trend may be set forth in the risk level description 268. Graphical indications of a risk level associated with each of the risk factors used in determining the overall risk level for a country may be provided in the risk factor area 254. The various risk factors may be listed in the risk factor area 254 along with corresponding risk factor icons 270 that may be similar in configuration to the risk level icon 266 for the country and indicate a risk level and a risk trend assigned to the risk factor in a similar manner. The country map area 256 may show an enlarged portion of the world map area 214 centered on the selected country, with the selected country and the surrounding countries being color-coded to correspond to their assigned risk levels. Similar to the world map area 214, the position of the cursor within the country map area 256 may be detected and a country identification window 272 may be displayed with the name of the country over which the cursor is disposed. For the selected country, a capital city indicator 274 may be displayed on the map at the appropriate location within the selected country, and the text within the country identification window 272 may change to the name of the capital city (Tashkent) when the cursor is disposed at the capital city indicator 274. The country map area 256 may also include a return to world map button 276 that may be clicked by the user to return to the home page 210 for selection of another country.

Figure 10:
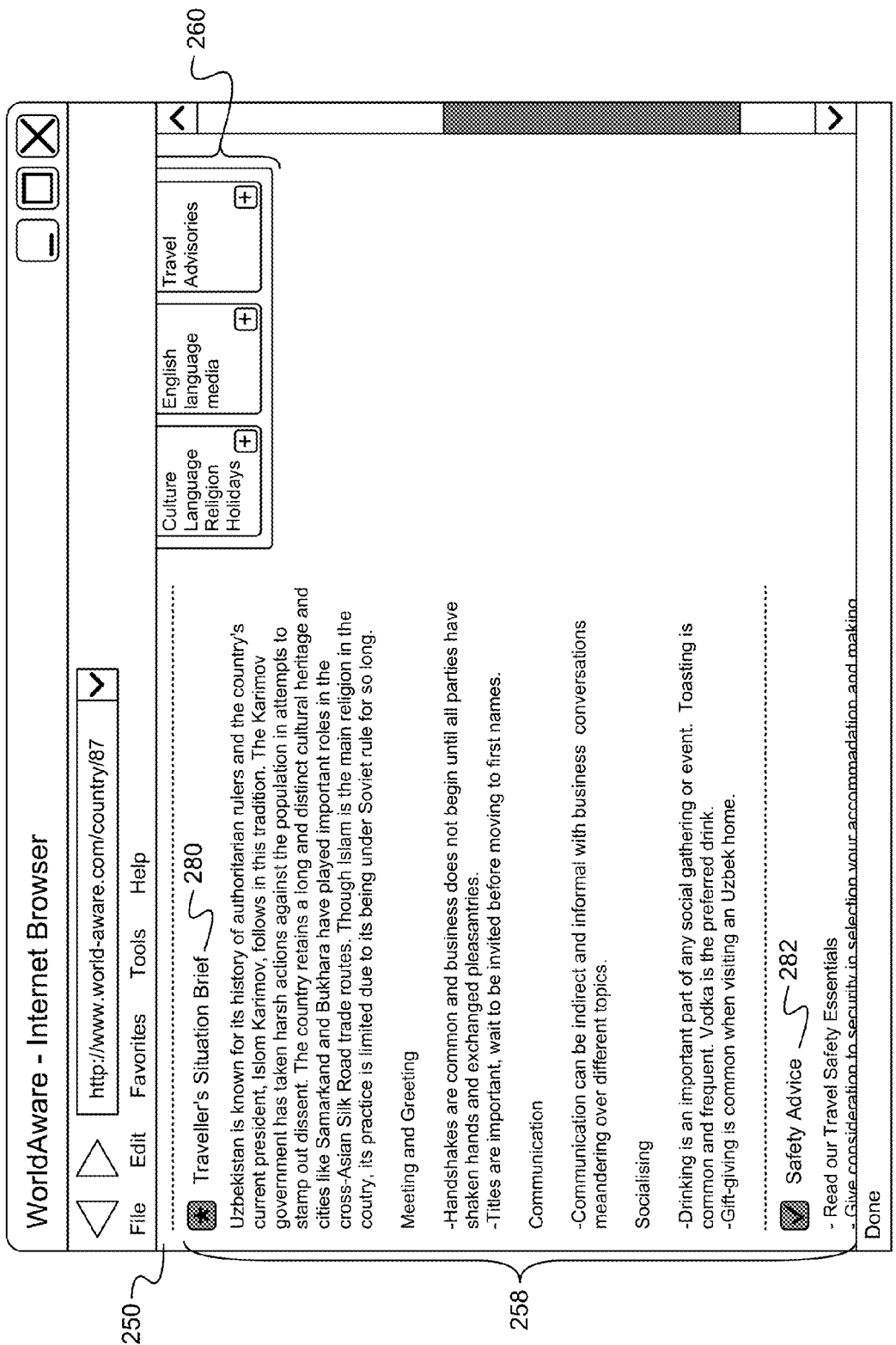
FIG. 10 is a second portion of the country information page of FIG. 9.
Figure 11:
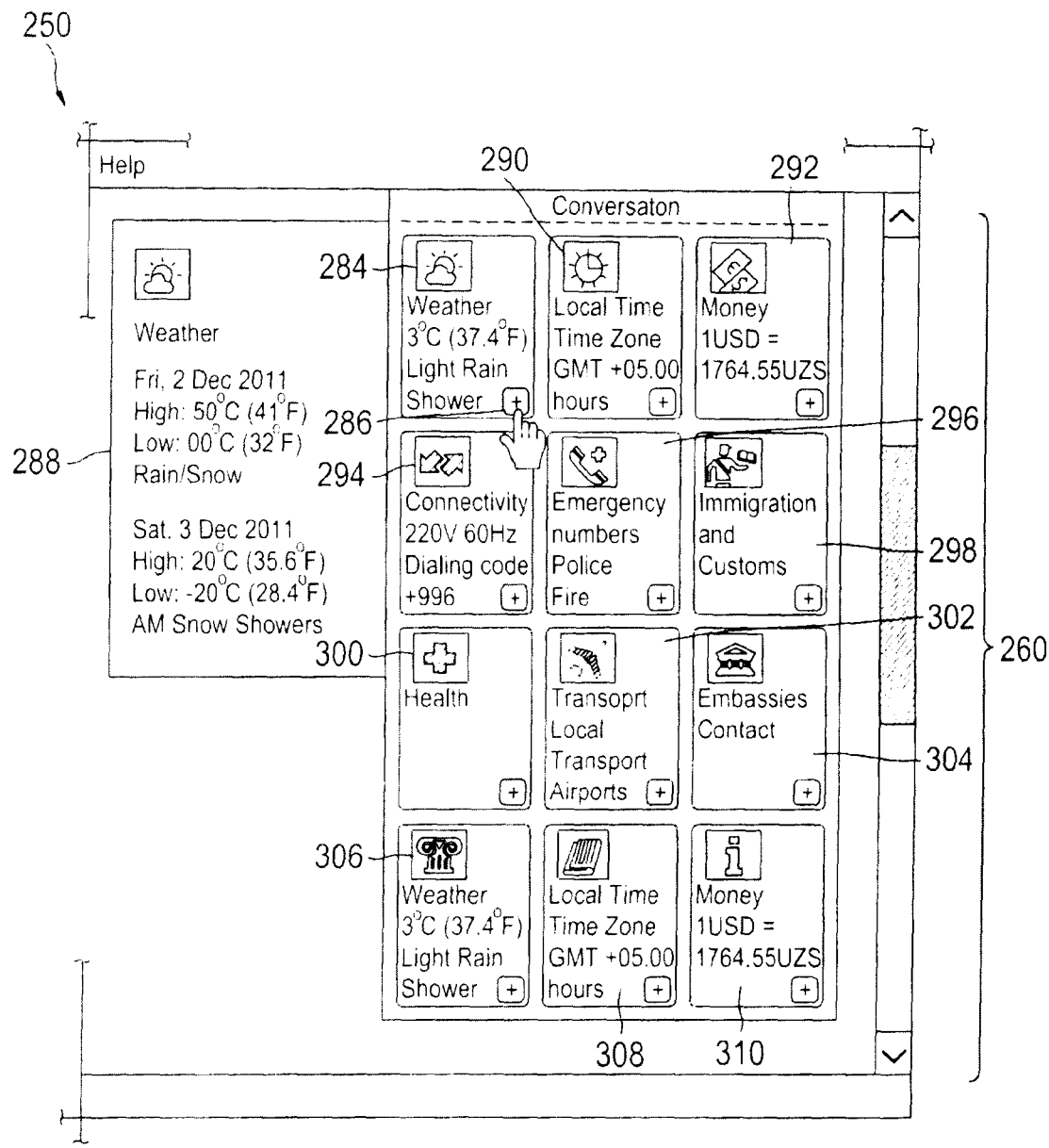
FIG. 11 is an enlarged view of country features icons of the country information page of FIG. 9.

The travel information area 258 of the country information page 250 may provide additional textual information that may be helpful to the users in managing their risk while in the particular country. A traveler situation brief area 278 may provide additional information regarding the factors and circumstances causing a particular risk level to be assigned to the country. The area 278 may contain a general description of the risks in the country, and more specific information relating to any of the risk factors identified in the risk factor area 254 as presenting a high level of risk, such as the state impunity and state corruptibility factors that present a severe level of risk in the illustrated embodiment. A cultural awareness area 280 is shown in FIG. 10 may provide more general information regarding the local culture and customs in the country. The area 280 can include information relating to religious customs, business and social customs, tribal cultures and honor codes, and the like, that may be encountered during travel within the country. A safety advice area 282 may provide additional information regarding best practices for ensuring traveler safety while in a particular country. The safety advice may include suggestions as to hiring security or engaging security-trained drivers for travel within the country, safe lodging accommodations, effective emergency plans and communications arrangements and the like.

The country features icons 260 provide information related to specific topics that are relevant to travel within the selected country. The country features icons 260 are shown in greater detail in FIG. 11. Twelve specific icons 260 are shown in the illustrated embodiment, but more or fewer icons 260 may be presented for a selected country as may be necessary to convey the essential information to the user. A weather icon 284 may provide a brief indication of the current temperature and weather conditions in the country. The weather icon 284 may also include a button 286 that may be clicked to cause a weather detail window 288 to be displayed with additional information such as an extended forecast for weather conditions in the country. The weather detail window 288 may display additional weather forecast information, including content provided by a third-party weather service. Each of the country features icons 260 may include similar functionality to provide a basic level of information on the icon and additional information in a window that may be displayed by clicking on a corresponding button of the icon. Consequently, a time zone icon 290 displaying the local time relative to Greenwich Mean Time may have a corresponding window that displays the current Greenwich Mean Time and the current local time. A currency icon 292 may provide a conversion between the user's currency in the currency of the selected country, and a currency window may provide additional information on the local currency of the selected country as well as information regarding the availability of credit and debit cards and ATMs, and the acceptance of Travelers Cheques within the country.

A connectivity icon 294 and accompanying window may provide the user with information relating to the type of power available for use with electronic devices and the dialing code for making telephone calls into the country. An emergency numbers icon 296 and the corresponding window may provide telephone numbers and other contact information for police, ambulance, fire and rescue services. The telephone numbers may include both landline and mobile emergency numbers and general telephone availability information. An immigration and customs icon 298 may open a window providing visa requirements and other requirements for entering and exiting the country, along with a list of items that are prohibited from being brought into the country. A health icon 300 and corresponding window may provide health-related information such as vaccination requirements, a listing of diseases to which travelers may be exposed while traveling within the country, and information on water sanitation with suggestions for avoiding known health risks presented by the water supply.

A transport icon 302 may open a window providing information regarding travel into and out of the country as well as travel within the country. A listing of airports within the country may be provided, along with descriptions of the availability and logistics of traveling via railways, buses, taxis, subways and other modes of transportation. A window associated with an embassy icon 304 may provide a list with contact details for the embassies for various other countries that are located within the selected country. The information for the embassies may include the addresses, telephone numbers, e-mail contact information and business hours of operation. A culture icon 306 and corresponding window may provide cultural information such as the language spoken in the country, the religions practiced within the country, and holidays celebrated in the country during the year. A window corresponding to a media icon 308 may provide a listing of newspapers, radio stations, websites and magazines that may be available within the selected country in the user's native language. Finally, a travel advisory icon 310 and associated window may provide links to travel advisory webpages offered by the governments of other countries that may have travel related information for the selected country.

Mobile Applications

The information available in the travel risk management system 10 may also be provided to remote users 20 accessing the system 10 via portable computing devices 26, 28. FIGS. 12-17 illustrate a series of pages that may be provided in a mobile application (mobile app) of the travel risk management system 10 that may be downloaded and installed on the portable computing devices 26, 28 and used by the remote user 20. The portable computing device 26 in the form of a smart phone is illustrated in the drawing figures. However, those skilled in the art will understand that similar pages and functionalities may be provided by applications at other types of portable computing devices.

Figure 12:
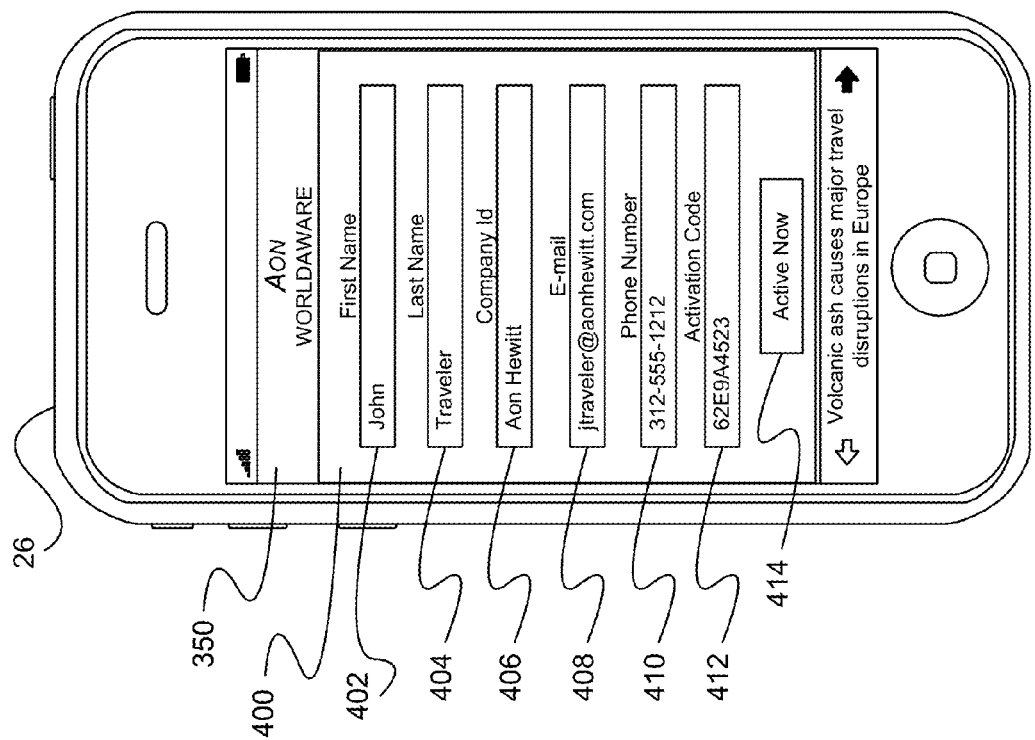
FIG. 12 is a front view of a portable computing device displaying an activation page of a mobile application of the system of FIG. 1.

Once the mobile app is installed at the device 26, an icon for the mobile app may appear on a screen 350 of the device 26 and allow the user to launch the mobile app by tapping the icon. The first time the mobile app is launched after installation on the device 26, the mobile app may cause the screen 350 to display an activation page 400 as illustrated in FIG. 12. The activation page 400 may provide fields for entry of information necessary to identify the user and to verify that the user is authorized to access the travel risk management system 10. Consequently, the activation page 400 may provide a first name field 402, a last name field 404, a company identification field 406, an e-mail address field 408, a telephone number field 410, and an activation code field 412. For each companies subscribing to the travel risk management system 10, the company may be assigned a unique company identification code and each employee of the company to which access to the system 10 is provided may be assigned a unique activation code. After the information is entered into the fields 402-412, the user may tap an activate now button 414 to cause the mobile app to execute a user authorization routine to verify that the company identification and activation code combination entered by the user match a record found at the database server 32. If the combination is valid, the mobile app may store the information entered in the fields 402-412 at the device 26, and may forward the information to the business application server 30 for storage at the database server 32, for authorization verification during subsequent launches of the mobile app and for use in various aspects of the functionality described hereinafter.

The users may be restricted in the number of portable devices 26 on which an activation code may be used. In such implementations, a counter on the activation code record at the database server 32 may be incremented to reflect the actuation of this additional device. If the counter is less than or equal to the limit, the system 10 may allow activation of the mobile app on the device 26. If the user has already met the limit on activations, the system 10 may deny the user the ability to activate the mobile app on this device 26.

If the user enters a valid company identification and activation code combination, the mobile app may cause the device 26 to display a mobile app home page 420 at the screen 350. The home page 420 may facilitate navigation by the user through the functionality provided by the mobile app. In the illustrated embodiment, icons on the home page 420 allow the user to access the desired functionality. In this example, the home page 420 includes a risk map icon 422, a travel safety icon 424, and embassies icon 426, a watch list icon 428, a destination search icon 430, a resources icon 432, a media icon 434, a settings icon 436, and a system provider information icon 438. The home page 420 may also have a current news box 440 that may provide the user with travel related headlines from around the world. The box 440 may have arrows allowing the user to scroll back and forth through the headlines, and the mobile app may load the complete news story on the page 420 when the user taps the displayed headline in the box 440.

Figures 14, 15:
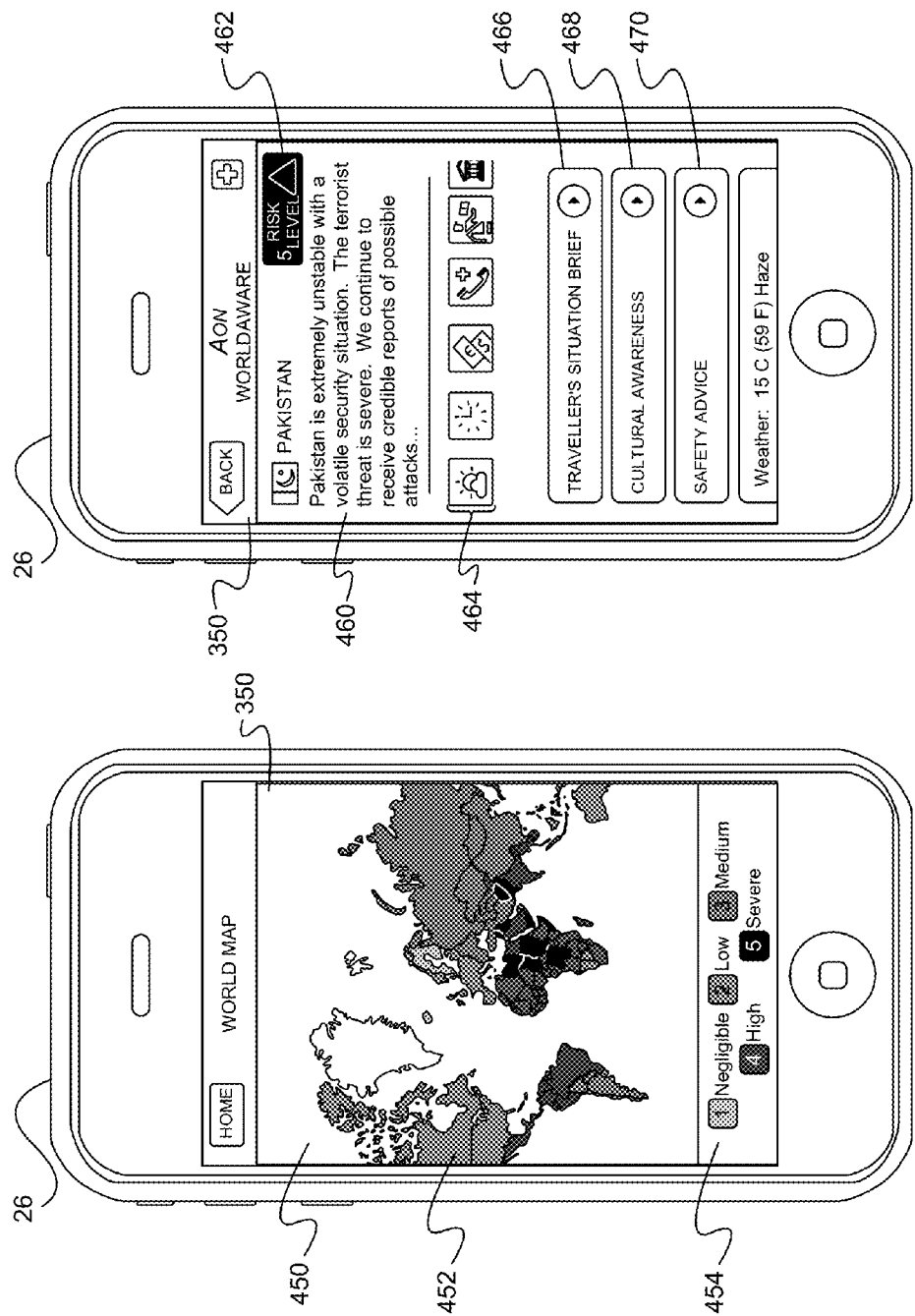
FIG. 14 is a front view of a portable computing device displaying a risk map page of the mobile application of the system of FIG. 1.
FIG. 15 is a front view of a portable computing device displaying a country information page of the mobile application of the system of FIG. 1.

Tapping the risk map icon 422 on the home page 420 may cause the mobile app to load a risk map page 450 as shown in FIG. 14. The risk map page 450 may provide a world map 452 similar to the list area 214 of the home page 210, with the countries having colors corresponding to their assigned risk levels. A rating system information box 454 of the risk map page 458 may provide a cross-reference of the risk levels and their corresponding colors for use by the user in determining the risk level assigned to the countries on the world map 452. The mobile app may also provide a menu option for alternating the world map 452 between a map view of the countries and a satellite view. The user may enlarge or reduce the risk map 452 by touching the screen 350 in the manner commonly used for enlarging and reducing page content in operating systems for portable computing devices with touchscreens. The world map 452 may be further enhanced by providing graphical pushpins (not shown) for each of the countries having the risk level number assigned to the country, the corresponding risk color or both.

Figure 16:
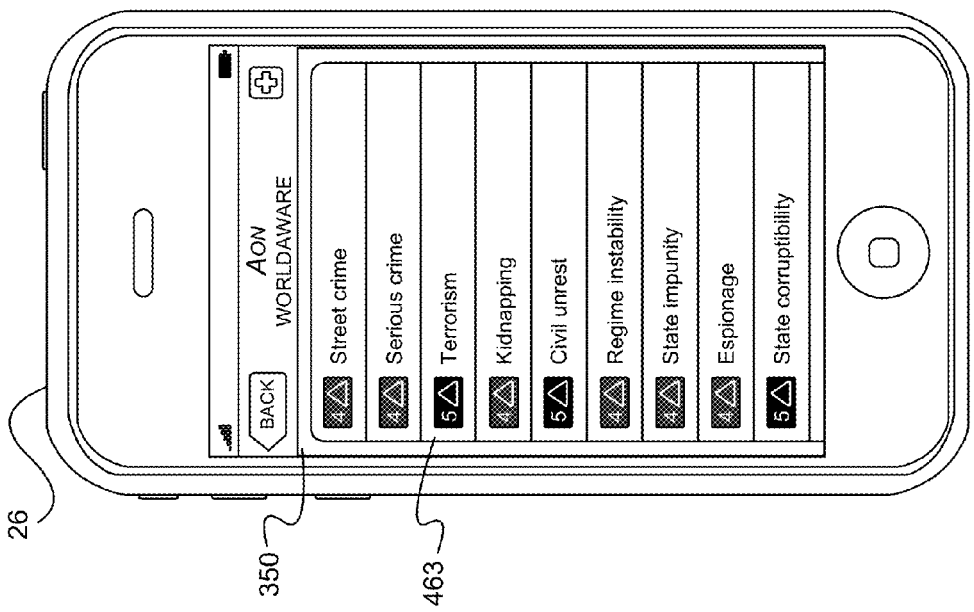
FIG. 16 is a front view of a portable computing device displaying a risk factor page of the mobile application of the system of FIG. 1.

When the country or pushpin is tapped by the user, the mobile app may cause a window to be displayed on the screen 350 containing the country name, the risk level assigned to the country, the risk trend for the country and an arrow that may be tapped to display a country information page 460 as shown in FIG. 15. The information displayed in the country information page 460 may be similar to that presented in the country information page 250 of the web-based application. Consequently, the country information page 460 may display the country name, flag, a risk level description for the country and a risk level icon 462 having the risk level number and corresponding color along with an indication of the risk trend for the country. Tapping the risk level icon 462 may cause a risk factor page 463 is shown in FIG. 16 that may list the various risk factors with corresponding risk factor icons indicating a risk level and a risk trend assigned to each risk factor used in determining the overall risk factor for the country.

Returning to FIG. 15, the page 460 may also include country features icons 464 similar to the icons 260 of the page 250 and maybe displayed such that the user may scroll left and right through the icons 464 to find an icon corresponding to the desired information. In addition to the weather, local time, currency, emergency numbers, and immigration and customs icons shown in FIG. 15, additional icons for embassies, health information, transportation, culture, native language media, connectivity and foreign travel advisories may be provided and displayed as a user scrolls from side to side through the icons 464. For each of the icons 464, the user may tap the icon to have a window displayed or have a corresponding page displayed with similar information as described above for the icons 260. The country information page 460 may further include a traveler situation brief button 466, a cultural awareness button 468, and a safety advice button 470 that when tapped by the user may lead to corresponding pages providing similar information as that shown in the areas 278-282, respectively, of the country information page 250.

Figure 13:
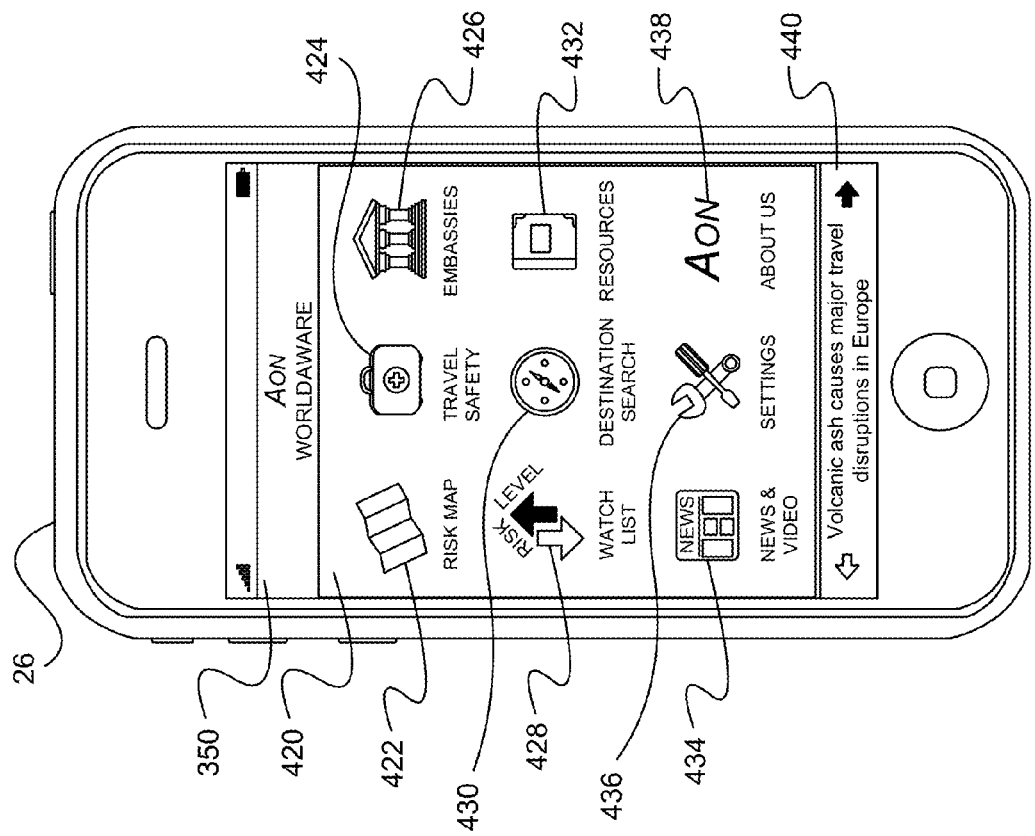
FIG. 13 is a front view of a portable computing device displaying a home page of the mobile application of the system of FIG. 1.

The travel safety icon 424 on the home page 420 of FIG. 13 may cause a travel safety page to be displayed on the screen 350 with general travel safety information for various aspects of travel planning and conduct that are applicable to most countries. The travel safety icon 424 may also provide an alternative path for navigating to a country's safety advice page than using the risk map page 450 to select a country and then tap the safety advice button 470 on the country information page 460. The travel safety page may include a country search icon that may be tapped by the user to cause a country listing page to be displayed. Selection of a country from the country listing page may cause the country's safety advice page to be displayed in the same way as tapping the safety advice button 470 of the country information page 460.

The embassies icon 426 on the home page 420 of FIG. 13 may cause an embassy locator page (not shown) to be displayed allowing user to select a country and have a list of embassies for the selected country or within the selected country to be displayed. The embassy locator page may allow the user to tap an icon to elect to view a list of embassies for a selected country located in other countries. After electing to show embassies for a selected country, a listing of countries may be displayed allowing the user to select one or more countries, or all countries, for which to view their embassies. After the country or countries are selected, a list of the embassies for the country or countries located around the world may be displayed. The embassy locator page may also allow the user to tap another icon to elect to view a list of embassies of other countries located within a selected country or countries. A similar listing of countries may be displayed allowing the user to select one or more countries having other countries' embassies located therein. After selecting the countries, a list of embassies located within the countries may be displayed. Each embassy list may include the associated location and contact information for each embassy in the list. The embassy listing may be integrated with the functionality of the operating system to automatically dial a telephone number of an embassy when a telephone number is tapped by the user, or to access a navigation application to provide directions from the user's current location to an embassy. The embassy listing page may also provide an icon or menu option to switch to a map view on which the locations of the embassies are identified by pushpins or other graphical symbols that can be selected to have the information from the corresponding embassies displayed on the screen 350.

The watch list icon 428 of the home page 420 may allow user to view lists of countries having significant travel risks or likely to have significant travel list in the future similar to the watch list area 212 of the home page 210. When the watch list icon 428 is tapped by the user, a watch list page (not shown) may be displayed with a severe risk icon, a high-risk icon and an increasing risk icon. When one of the icons is tapped by the user, a list of all countries having the corresponding risk level or increasing risk trend may be displayed on the screen 350. The user may scroll up and down the displayed lists and select one of the countries for displaying its country information, with the mobile app responding by displaying the corresponding country information page 460 of the selected country.

Figure 17:
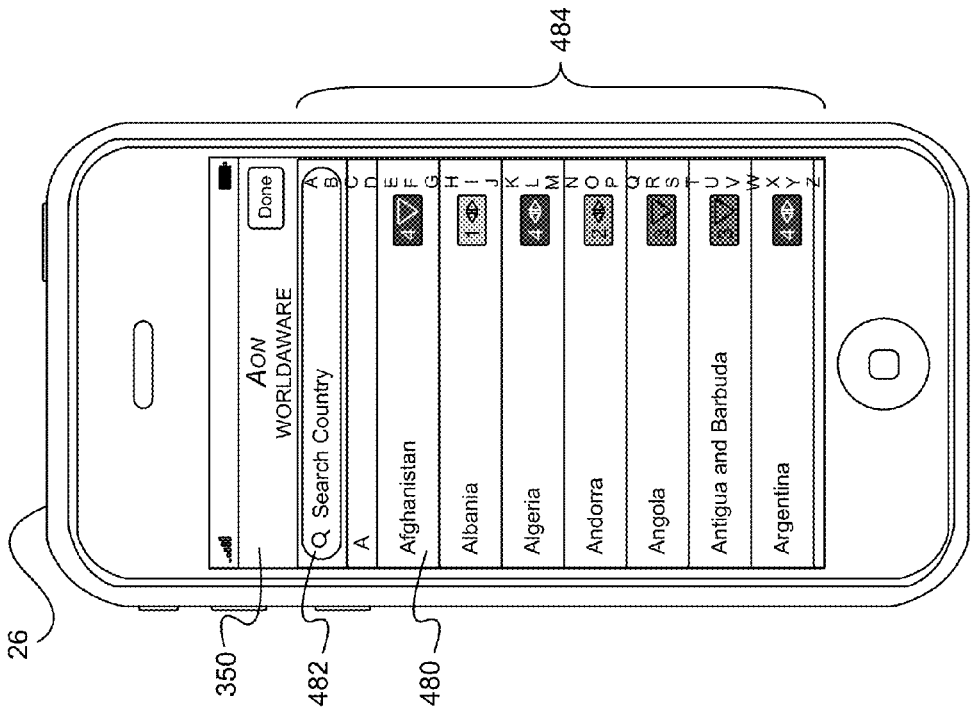
FIG. 17 is a front view of a portable computing device displaying a destination search page of the mobile application of the system of FIG. 1.

The destination search icon 430 on the home page 420 may allow a user to navigate to the country information page 460 for a country via an alphabetical listing of countries. The user tapping the destination search icon 430 may cause a destination search page 480 to be displayed on the screen 350 as shown in FIG. 17. The destination search page 480 may provide an alphabetical listing of countries along with an icon or other graphical information indicating the risk level and risk trend assigned to each country. A search field 482 may be provided to allow the user to narrow the displayed list of countries by entering the initial letter or letters of the country name. As each letter is entered into the search field 482, the list of country names may be narrowed until the user sees a particular country of interest and selects the country to display the corresponding country information page 460. As an alternative for narrowing the displayed list of countries, the destination search page 480 may include a letter search area 484 listing the letters of the alphabet. Tapping one of the letters in the letter search area 484 may narrow the list of displayed countries to those beginning with the letter tapped by the user. Tapping a different letter base which the list to display of countries beginning with the newly tapped letter.

The resources icon 432 of the home page 420 may be selected by a user to display links to travel related service organizations. A resources page (not shown) may include travel security links for homeland security, travel unsafe advice pages and weather services, health and safety links two organizations such as the Red Cross and the WHO, and links to other utilities such as currency converters, translators and ATM locators. The media icon 434 of the home page 420 may be selected to cause a media page (not shown) to be displayed containing information such as date, time, headlines and news sources for one or more countries that may be specified in user settings in a manner described more fully below. The displayed headlines on the media page may be tapped by the user to cause the source article to be displayed on the screen 350.

The settings icon 436 may navigate the user to a page wherein the user may select and enter personal information to customize functionality provided in the mobile app. Tapping the settings icon 436 may cause a settings page to be displayed on the screen 350 that may allow the user to specify information such as their nationalization, passport information, frequent flyer numbers, countries to be saved in the memory 152 of the device 26, and for which to display news on the media page, and other travel related information. For each type of information, the settings page may provide an icon that may be selected by the user to cause a display of a corresponding data entry page for inputting the user's information. For example, a nationality icon may cause a list of countries to be displayed from which the user may select one country could be the user's home country. With the user's nationality specified, the mobile app may use the home country, for example, in determining the monetary unit to use for currency conversions and for default embassy selections in the embassy selection routine. Passport information and frequent flyer number icons may navigate to windows or pages allowing the user to enter their passport information and information for one or more frequent flyer programs in which the user participates. A show news icon may provide a page (not shown) allowing the user to specify one or more countries for which media information will be displayed when the user taps the media icon 434. Additional icons and corresponding display pages may be provided to allow users to input additional personal information that may be used to customize the various functions of the mobile app to their needs.

User Location Tracking and Risk Management Event Response Applications

An important aspect of managing risks to which employees may be exposed is maintaining information on the location of the employees during travel and being able to quickly disseminate information to them when risk management events occur. The present risk management system 10 provides employers and risk managers with the facilities to monitor an employee's planned and actual locations during travel, and to respond to the occurrence of a risk management event and execute a risk management response strategy to provide required information and other resources to the employees when risk management events occur in their area.

Figure 18:
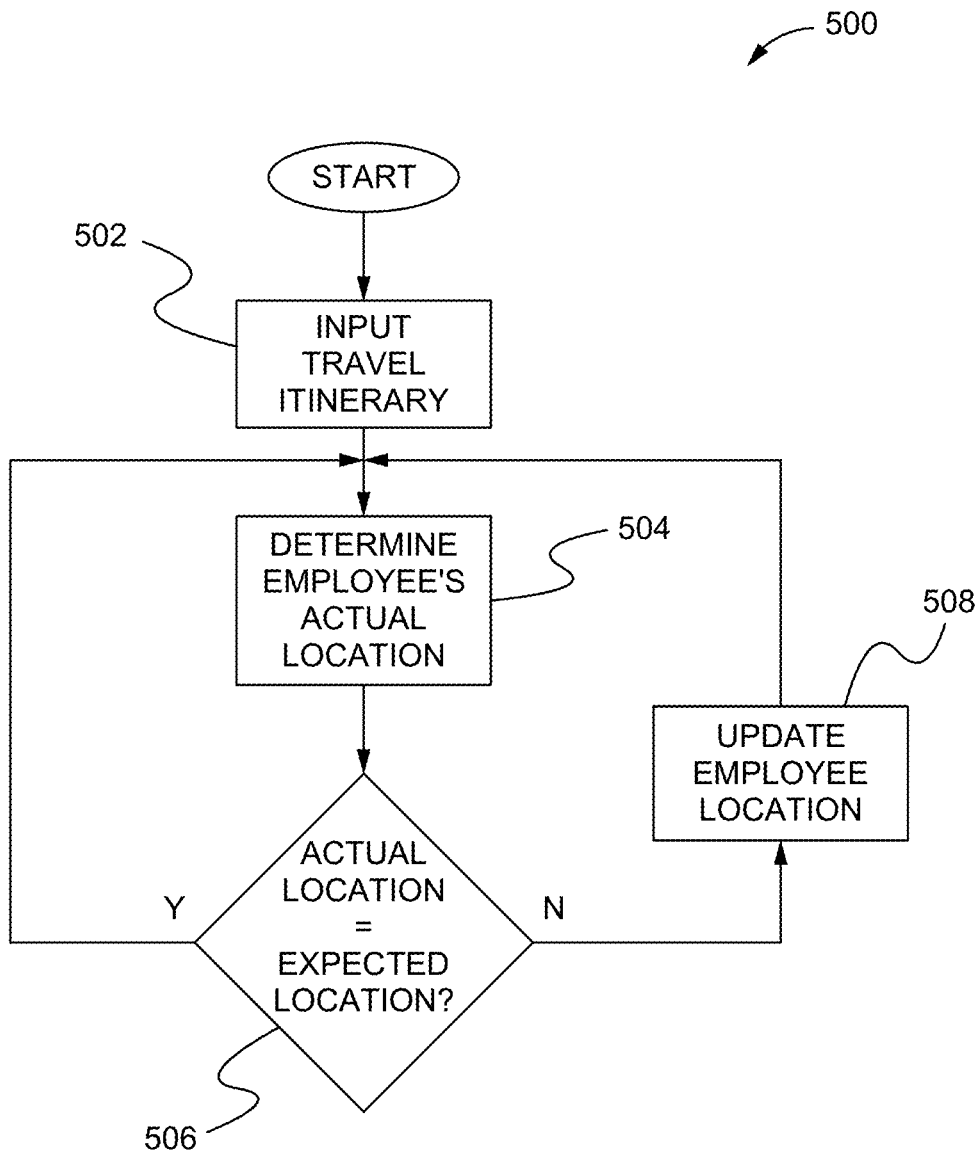
FIG. 18 is a flow diagram of an employee travel monitoring routine of the system of FIG. 1.

FIG. 18 illustrates a flow diagram for an employee location monitoring routine 500 in accordance with the present disclosure. The routine 500 may begin at a block 502 wherein a travel itinerary for an employee may be input into the system 10 and stored therein. The input method and storage location may vary based on the particular implementation of the system 10. In one embodiment, an employee's itinerary may be received by a local user 36 and input at a local workstation 34, and stored by the business application server 30 in a database of employee locations and itineraries at the database server 32. The user 36 may receive the itinerary via e-mail or other means of delivery and input the itinerary and employee information via an itinerary entry page (not shown). A similar entry page at a remote workstation 22, 24 or portable computing device 26, 28 may allow remote users 18, 20 to input itineraries and have the information transmitted over the network 16 and stored at the database server 32. In additional embodiments, the system 10 may be integrated with third-party reservation systems such that itineraries may be transmitted to the business application server 30 when travel scheduled, and an itinerary loading routine may interpret the itinerary and load the information for the employee into the database server 32. Regardless of the input method, additional functionality may also be provided to update the information stored in the database server 32 when changes are made to the employee's itinerary. The stored information may include employee identification information, dates of travel, city and country of travel, flight information, hotel information, contact phone numbers including cell phone number, e-mail addresses and the like.

The itinerary information provides the risk management system 10 with expected locations of the employee during particular time periods. However, travel arrangements can change during a trip, and a travel itinerary is not necessarily updated to reflect in-trip variations. Consequently, the system 10 may provide alternative mechanisms for updating an employee's actual location during travel. At a block 504, the risk management system 10 may determine the actual location of an employee during travel. In one embodiment, the business application server 30 may be configured to ping the cell phone of a traveling employee during the trip to cause cell phone to respond with the employee's current location. At scheduled intervals, and employee location routine 500 may query the employee itineraries stored at the database server 32 for a list of employees currently scheduled to be traveling. For each employee, the business application server 30 may transmit a location request message to the employee cell phone number stored in the database server 32. When the location request message as received at the cell phone, the mobile app of the system 10 on the cell phone may format a location response message containing identifying information for the employee, such as an employee ID number or cell phone number, the company identification and activation code assigned to the employee, and geographic location information such as GPS coordinates, a postal code or the like. The cell phone may then transmit the location response message back to the business application server 30 over the network 16. Upon receiving the location response message, the employee location routine 500 may compare the actual location of the employee from the location response message to the location on the itinerary stored at the database server 32 at a block 506. If the actual location matches the expected location of the employee from the itinerary, employee is traveling according to the itinerary, no updates to the database server 32 are necessary and control may return to the block 504 for subsequent employee location checks at a later time. If the employee's actual location is different from the expected location, control may pass to a block 508 where the employee location routine 500 may update the employee's itinerary stored at the database server 32 to reflect the employee's current actual location.

The above logic may apply where the employees travel as planned and an itinerary may be available for storage in the database server 32. In some situations, however, employee travel may be unplanned and/or the travel itinerary may not be available for storage and tracking of the employee. For these situations, it may be necessary to implement alternative mechanisms for storing the employee's location, and in particular where the employee travels to high-risk locations. In one embodiment, the risk management system 10 may have functionality to constantly monitor the employee's location to be able to determine which employees are in a location when a risk management event occurs. At block 504, the employee location routine 500 may be configured to send the location request message to all employees, and not just to those with stored itineraries. When the location response messages are received from the cell phones of employees having stored itineraries, the employee location routine 500 may compare the actual location of the employee to the expected itinerary location at block 506 as discussed above. For location response messages from cell phones of employees without itineraries, the employee location routine 500 may handle the message in various ways depending on the particular implementation of the risk management system 10. In some implementations, the current location of employees may be constantly monitored and stored, and the location from the response message may be used to update the employee's record on the database server 32. In other implementations, the system 10 may only track employees that are in high-risk (level 4 or 5) areas, and the record in the database server 32 may only be updated when the location response message contains a location within a high-risk country. Location response messages indicating locations in low-risk countries may be ignored or discarded by the employee location routine 500 unless the currently stored employee location is within a high or severe risk country, in which case the location in the low risk country may be substituted in the database server 32 for the employee.

As an alternative to the server-initiated location updates that require both a request message from the business application server 30 and a response message from the employee's cell phone, the travel risk management system 10 may perform cell phone-initiated updates. Logic may be provided in the mobile app of the risk management system 10 to cause the cell phone to automatically transmit a location message with the current location of the cell phone at specified times or upon the occurrence of specified triggering events. In one embodiment, the mobile app may be programmed to cause cell phone to transmit location messages at predetermined intervals such as hourly or daily, or more or less frequently, regardless of the employee's location or any other activity. The cell phone may also, or as an alternative, transmit a location message when an event occurs, such as the employee launching the mobile app or turning on the cell phone. Upon receipt of the location message at the business application server 30, the location may be processed in an appropriate way, such as through one of the processes described above. In an alternative embodiment, the mobile app may store the travel itinerary for the employee traveler and transmit location messages during a scheduled trip, or compare the employee's actual location to the expected location on the itinerary, and transmit location messages only when the employee deviates from the trip itinerary. In a further alternative, the mobile app may store the country information and risk level information at the cell phone, and transmit the location message to the business application server 30 only when the employee is traveling in a high or severe risk country. At regular intervals or upon the occurrence of a triggering event, the mobile app may check the risk level for a country in which the cell phone is located and transmit the location message when the employee is in a high or severe risk country.

Figure 19:
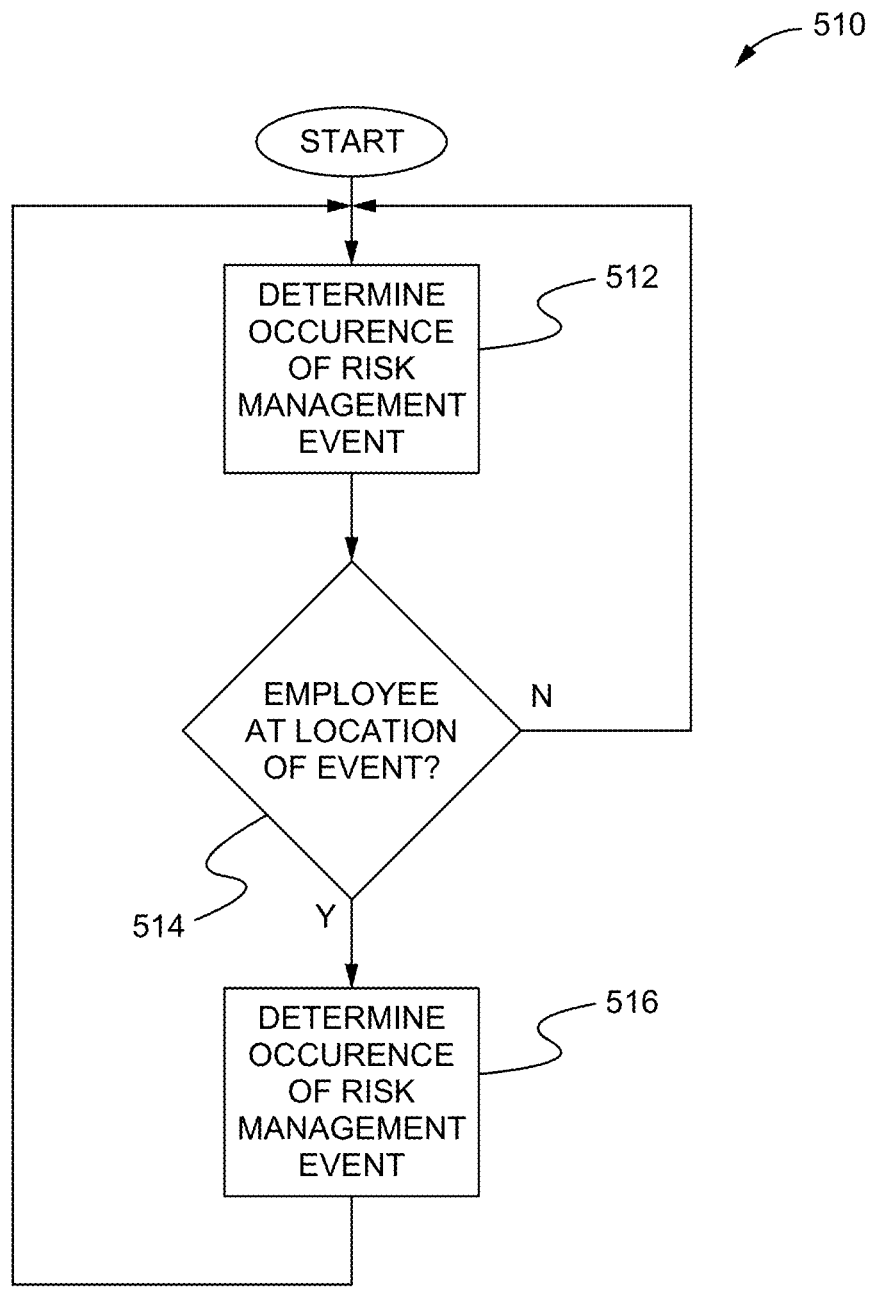
FIG. 19 is a flow diagram of a risk management event response routine of the system of FIG. 1

Turning to FIG. 19, with the database server 32 populated with current locations of the employees, the risk management system 10 may be configured with a risk management event response routine 510 enabling the system 10 to respond to risk management events occurring in countries where employees are located. At a block 512, the risk management system 10 may determine the occurrence of a risk management event, such as a political uprising, invasion, earthquake, tsunami, hurricane or other meteorological event, and the like. The risk management event may be detected by the risk management system 10 via interfaces with global or local emergency response systems, law enforcement agencies, news agencies, and the like, or the risk management event may be input into the system 10 by a system user 18, 20, 36 upon the occurrence of the event. The information for the risk management event may include the geographic location of the event. The detection of the risk management event may trigger a risk management response to the event. At a block 514, the risk management event response routine 510 may query the database server 32 for employees having actual and/or scheduled locations in geographic proximity to the risk management event. The search may be performed for all locations within the country of the event or within a specified distance from the event. Depending on an anticipated duration of the risk management event and after effects of the event, the routine may perform a prospective search of the stored itineraries for employees scheduled to travel into the area of the risk management event within a specified time in the future. Where the locations of employees traveling in high and severe risk countries are stored, employees may be notified when risk management events occur in countries where issues are expected. Where locations for all employees are stored by the risk management system 10, the ability may exist to notify employees traveling in low-risk countries where risk management events occur without advanced warning.

If no employees are determined to be in, or soon to enter, the affected location at block 514, it may not be necessary to transmit event notifications, and control may return to the block 512 for the risk management system 10 to continue monitoring the occurrence of subsequent risk management events. If employees are found to be in the area of the risk management event, control may pass to a block 516 wherein the risk management event response routine may execute a risk management event response. The characteristics of the risk management event response may vary based on the type of event that has occurred. At a minimum, the response may include transmitting an event notification message to the cell phones of the employees in the affected area via SMS messaging, electronic mail or other electronic means, with an alert regarding the event, and other information such as the status of the event, the expected duration of the event, emergency contact information and evacuation routes. For weather related events, the event notification message may include embedded content from third-party providers with current conditions and future forecasts.

The message transmitted to the employee cell phone may be informational only, or may require a response. For example, the mobile app may be configured to respond to the event notification message with an automatic reply containing the employee's identification or activation code and location. The event notification message may also require an employee initiated response message to acknowledge the employees receipt of the event notification message. Upon receipt of the response message, the risk management event response routine may note the acknowledgment by the employee and maintain lists of employees that have not responded to the initial event notification message. For employees that do not respond, subsequent follow-up messages may be transmitted to the employee's cell phone, or to local authorities for notification of the employee's lack of response, or other measures for determining the status of the non-responding employees may be. The response strategy may also include transmitting information regarding the employees in the affected area to local resources that may assist in locating the affected employees, such as local offices of the company, local law enforcement and emergency responders, government embassies in the country and the like. Additional functionality for responding to the risk management event in support of the employees in the area of the risk management event will be apparent to those skilled in the art, and are contemplated by the inventors as having use in risk management systems in accordance with the present disclosure.

In one embodiment, the determination of a risk management event at block 512 may be provided by an employee that may be victimized by the event or in the immediate vicinity of the event and in a position to notify the operators of the system 10 about the event. The mobile app may be configured to allow the employee to communicate information about the event and their location to the business application server 30 by providing a panic button icon (not shown) on the mobile app home page 420. Upon the occurrence of a risk management event, tapping the panic button icon may cause the mobile app to format alarm message and transmit the alarm message to the business application server 30. The alarm message may include information identifying the employee and their location, and an indication that the message is an alarm message.

The mobile app may transmit the alarm message immediately, or be configured to allow the employee provide addition information about the risk management event and the employee's status. When the panic button icon is tapped, the mobile app may display a panic button information page (not shown) providing fillable fields or other input features. For example, the panic button information page may provide check boxes, pull down boxes and the like with selection options for various types of risk management events that may have occurred. Such events may include street or violent crimes, terrorist incidents, meteorological or geological events and the like. The panic button page may provide additional input options for allowing the employee to indicate their status after the event, such as injuries that may have been inflicted, property taken or damaged, business disruption and the like. After entering the necessary status information, the employee may tap a transmit icon (not shown) that may cause the mobile app to add the specified status information to the alarm message and transmit the alarm message to the business application server 30. Upon receiving the alarm message at the server 30, the risk management event response routine 510 may execute the risk management event response at block 516. The specific event response may be based, at least in part, on the information contained in the alarm message.

Administrative Application

As discussed above, in various portions of the functionality of the system 10, access to the web applications and mobile apps may be granted to users with valid client identification codes, activation codes or combinations thereof, and functionality of the system 10 may be driven off of information stored within the system 10 for the logged in users. In implementations of the system 10 where the system 10 is hosted by a provider and client companies subscribe to the provider for access to the available functionality, multiple levels of security and authorization may be provided to ensure only authorized users obtain access to the system 10 while also distributing the responsibility for the authorization process among multiple participants. In one implementation of the system 10, a first overarching or super administrative access level, hereinafter referred to as a super admin user, may exist at the system provider level with the authority to establish accessibility to the system 10 for the subscriber companies, and a second company administrative access level, hereinafter referred to as a client admin user, may exist at the client company level with the authority to grant authority for use of the system 10 to individual employees of the client company.

Each super admin user may be assigned a username and password having authority to access administrative applications of the travel risk management system 10. After the super admin user navigates to the URL for an administrative application of the system 10 and logs into the administrative application at one of the workstations 22-28, 34, the business application server 30 may cause an administrative overview page 600 as shown in FIG. 20 to be displayed at the workstation. The administrative overview page 600 may provide the super admin user with a listing of all existing clients entered into the system 10 and an overview of the associated licensing information for the client company. The company level information may include the company name, a company identification code that may be assigned by the super admin user or by the administrative application when the company is input, indications of the total number of activation codes that may be assigned for the company, the number of activation codes that have been assigned and are in use, and the number of available activation codes that have not been assigned and have not expired, and an indication of the status of the company as being active or inactive. The administrative overview page 600 may have an inactivate button 602 and an activate button 604 that may allow the super admin user to change the authorization status of the company. Active status for the client company may allow the client admin users for the company to generate, distribute and manage license activation codes as described more fully below. Inactive status and deactivation of the client company may deny the client admin users the ability to generate, distribute manage license activation codes, but may not affect the use of activation codes that have already been generated and distributed to employees of the client company.

Figure 21:
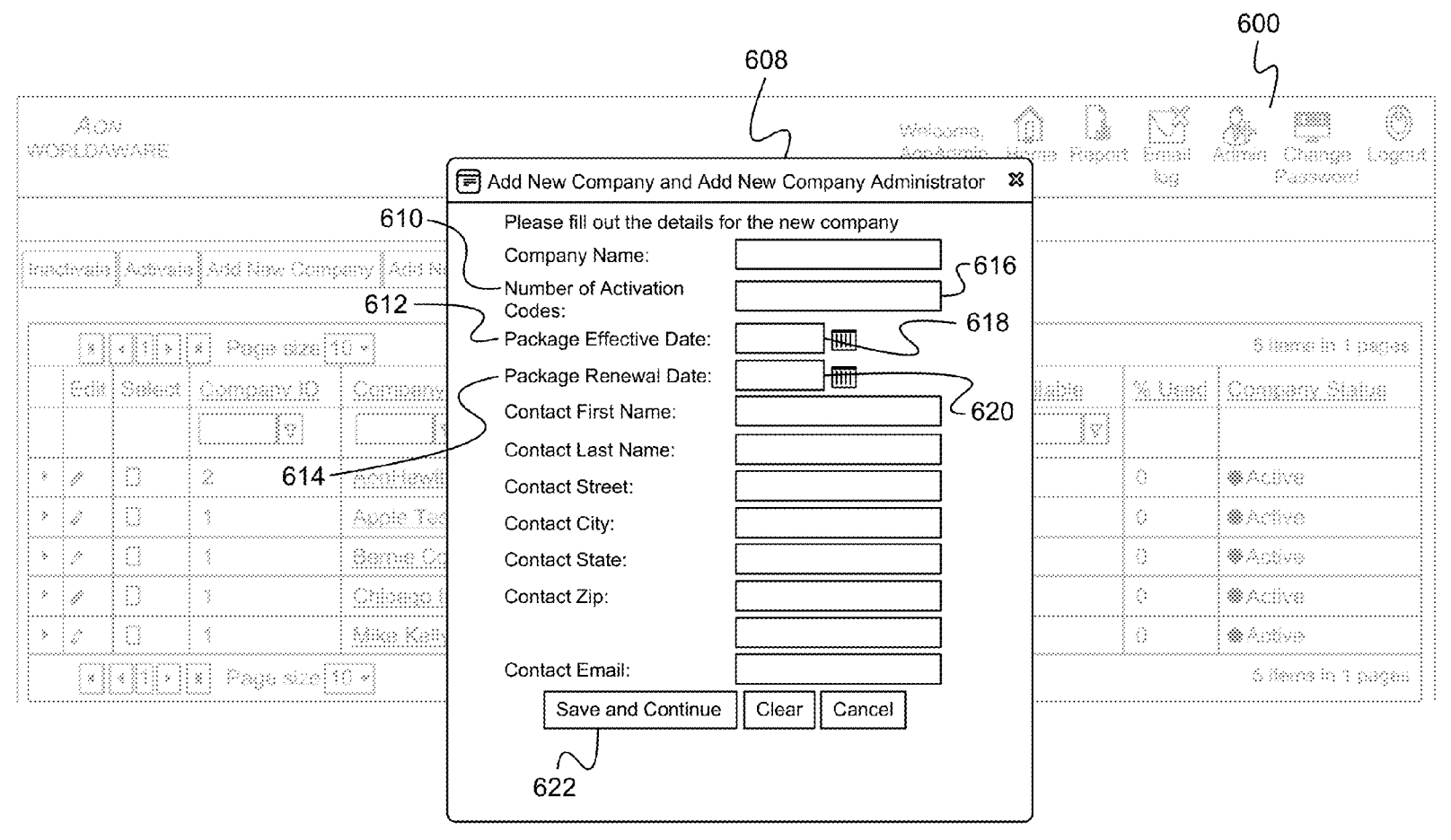

The administrative application may provide the super admin user with the ability to add new client companies and company administrators to the system 10 by providing an add new company button 606 and an add new company administrator button 607 on the administrative overview page 600. Clicking one of the buttons 606, 607 may cause an add new company window 608 to be displayed over the administrative overview page 600 as shown in FIG. 21. The add new company window 608 may provide prompts and corresponding fields for inputting the basic information for a new company such as company name, company contact name, address and other contact information. The contact name may be the primary contact for the company, but may or may not be assigned as a client admin user. Where an additional company administrator is being added for an existing company, the super admin user may input the name of the existing company in the corresponding field of the add new company window 608.

The add new company window 608 may also allow the super admin user to establish a first package of activation codes that may be assigned to employees of the company. For inputting the necessary information for the activation codes, the add new company window 608 may include a number of activation codes prompt 610, a package effective date prompt 612 and a package renewal date prompt 614, along with corresponding input fields 616-620. As the name suggests, the number of activation codes field 616 may allow the super admin user to specify the number of activation codes that may be assigned in the initial package. The super admin user may specify the earliest date in which the activation codes will allow the employees of the company to access the system 10 in the package effective date field 618, and a date at which access via the activation codes of the package will cease if the company does not renew a subscription for the system 10 in the package renewal date field 620.

After the information for the company is input on the add new company window 608, the super admin user may click a save and continue button 622. In response, the administrative application may cause the business application server 30 to generate a customer identification number for a new company, and to add a company record for the new company at the database server 32. For an existing company, the information for the new company administrator may be added to the company's record in the database server 32. At this time, the business application server 30 may also assign a package number for the requested activation codes and store the package number, the number of activation codes, and effective and renewal dates for the activation code package with the customer information at the database server 32 for later use by the super admin user or client admin user in assigning activation codes to employees of the company as described more fully below. The administrative application may also cause an e-mail message to be sent to the company contact/client admin user with login credentials for the contact to be able to log into the system 10 with authority to perform client admin user functions as described more fully below.

After the super user clicks the save and continue button 622, the add new company window 608 may close and the administration overview page 600 of FIG. 20 may be activated to show the list of subscribing companies. The newly added company may now be displayed in a company list 630 with information including the assigned company identification number 632, the company name 634, the total activation codes 636 for the company, the number of used activation code 638 and the number of available activation codes 640. After setup of the new company, and before activation codes are assigned to employees of the company, the total activation codes 636 and the number of available activation codes 640 are initially set to the number of activation codes specified during the add new company process, and the number of used activation codes 638 is set to zero.

When contact information for the company changes or when additional activation codes need to be generated, the super admin user may click on an edit icon 642 for the customer on the administrative overview page 600. Clicking on the edit icon 642 may cause an added company window 644 to be displayed over the administrative overview page 600 is shown in FIG. 22. The edit company window 644 may display the company name and the current contact information currently stored in the database server 32 for the subscribing company. The edit company window 644 may allow the super admin user to edit any of the company contact information with the exception of the company name. The edit company window 644 may allow the super admin user to create a new package of activation codes for the company by clicking on a create new package checkbox 646, and filling in the total number of activation codes to create, and the effective and renewal dates for the activation codes, in the corresponding fields of the edit company window 644. After entering the information, the super admin user may click on an update button 648 to cause the administrative application to have the business application server 30 make the necessary updates to the company record stored at the database server 32 and, if specified, to create a new package of activation codes for the company.

Figure 23:
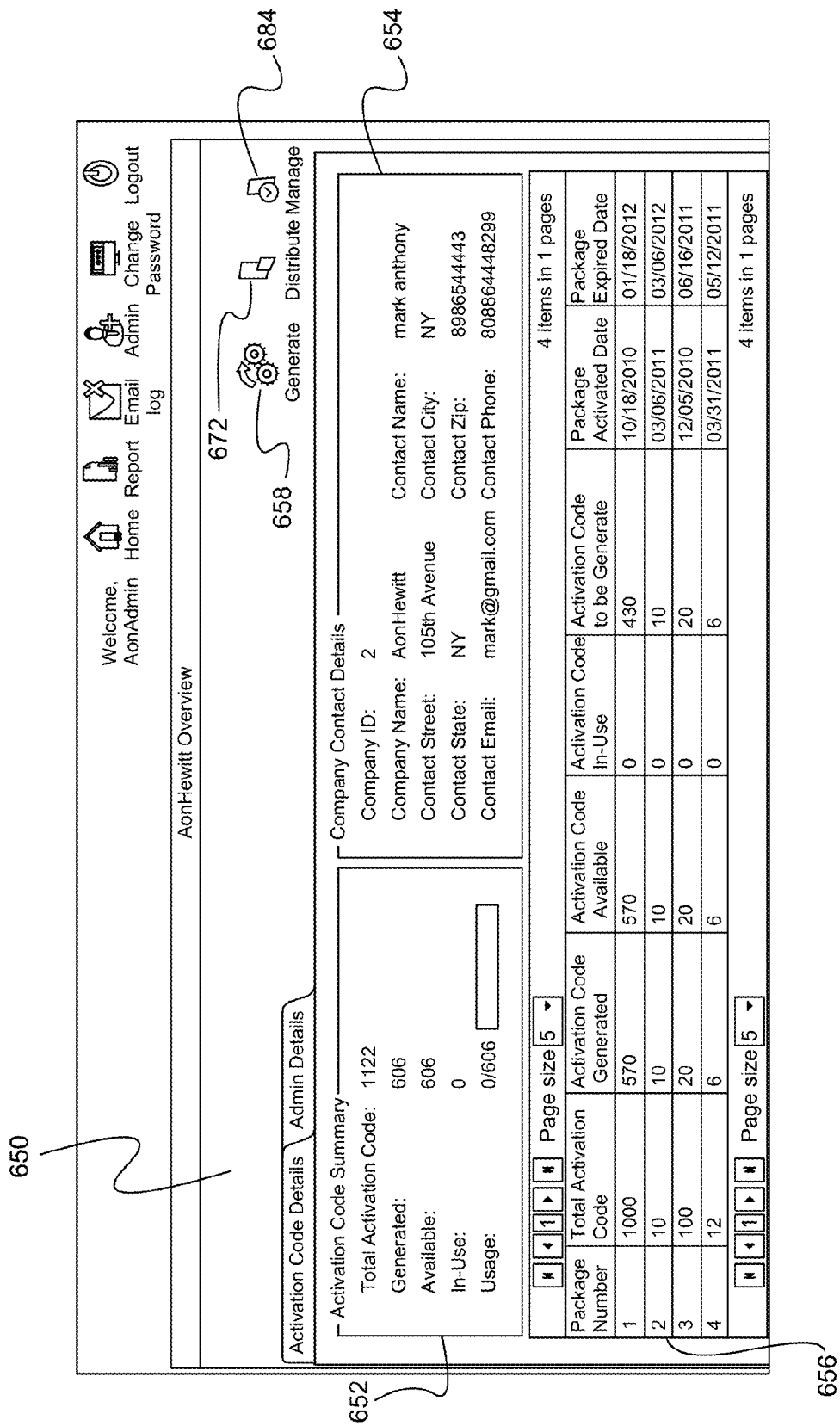
FIG. 23 is a company overview page for an administrative application of the system of FIG. 1.

After the super user clicks the update button 648, the edit company information window 644 may close and the administration overview page 600 of FIG. 20 may be reactivated. With the company entered into the system and activation codes authorized for use by the company's employees, super admin user and client admin user may be able to generate and distribute activation codes to the employees. From the administration overview page 600, a super admin user may click on a company name from the list of company names 634 to cause a company overview page 650 as shown in FIG. 23 to be displayed. For a client admin user, the company overview page 650 may be the initial page that is displayed after the client admin user logs into the administration application of the travel risk management system 10. Consequently, both the super admin user and the client admin users may have access to all of the functionality relating to the generation and distribution of the activation codes, and these users will be generically referred to as "admin users" in the following discussion where appropriate.

The company overview page 650 provides a summary of information for the subscribing company, including an activation code summary area 652, a company contact details area 654, and an activation code package list 656. The activation code summary area 652 may list the total number of activation codes assigned to the company, the number of activation codes that have been generated, the number of activation codes available for assignment to employees, a number of activation codes currently in use, and an indication of the percentage of the available activation codes that are currently in use. The summary may assist the admin user in determining whether it may be necessary to request authorization for additional activation codes from a super admin user. The company contact details area 654 may list the information input by the super admin user at the add new company window 608 and/or the edit company information window 644.

The activation code list 656 may provide details for each of the activation code packages that have been created for the subscribing company. The list entry for each activation code package may include the package number, the total number of activation codes allocated to the company in the package, the number of activation codes of the package that have been generated, the number of available activation codes, the number of activation codes in use, the remaining number of activation codes that can be generated for the package, and the activation and expiration dates for the activation codes of the package. A particular number of activation codes may be allocated to a package when a super admin user creates the package via the add new company window 608 or the edit company information window 644, but the activation codes may not actually be generated until the activation codes are needed for assignment to the employees by an admin user.

Figure 24:
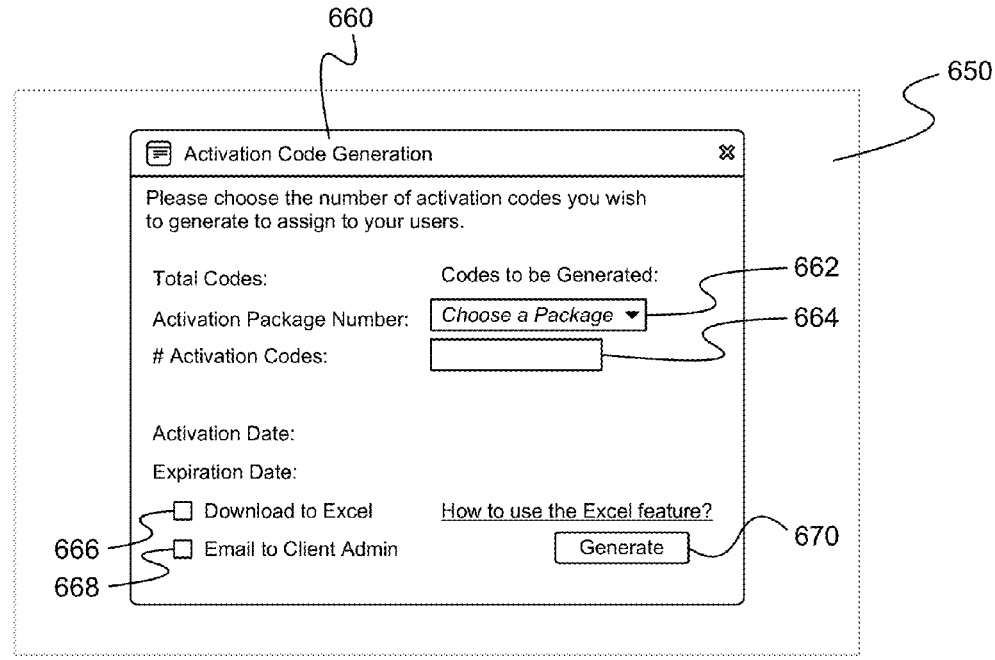
FIG. 24 is a portion of the company overview screen of FIG. 23 enlarged and with an activation code generation window displayed.

The admin user may click on an activation code generate button 658 to initiate an activation code generation process of the administrative application. Clicking on the button 658 may cause the administrative application to display an activation code generation window 660 on the company overview page 650 as shown in FIG. 24. The activation code generation window 660 may allow the admin user to generate activation codes for one of the available activation code packages. The activation code generation window 660 may provide a drop-down box 662 for selecting the activation package number from which to generate the activation codes, and a code number input field 664 for specifying the total number of activation codes to be generated from the selected activation package number. After the activation package number is selected, the activation code generation window 660 may be updated to display the activation expiration dates for the selected package. The admin user may also be able to elect to have the generated activation codes downloaded to a data file, such as an Excel spreadsheet or other data file, by clicking a download checkbox 666 and/or to have the activation codes e-mailed to the admin user's e-mail address by clicking an e-mail check box 668.

After the information is input on the activation code generation window 660, the admin user may click a generate button 670. In response, the administrative application may cause the business application server 30 to generate the number of activation codes specified by the admin user in the input field 664 and store the activation codes at the database server 32 for later distribution to employees of the company by the admin user as described more fully below. The activation codes may be generated using a systematic routine, a random number generation routine, or any other appropriate algorithm or strategy for generating unique codes for use in user verification and authorization. The statistics for the activation code package may also be updated by adding the number of newly generated activation codes to the number of activation codes generated and the number of activation codes available, and subtracting the number from the number of activation codes to be generated. If the download checkbox 666 is checked, the administrative application may create a data file containing the newly generated activation codes and associated information for the subscribing company and the activation package. The data file may be downloaded to the workstation 22-28, 34 at which the admin user is logged on, or to another storage location such as a network drive that may be designated by the admin user for storage of the data file. If the e-mail box 668 is checked, the administrative application may also generate and transmit an e-mail message containing the generated activation codes to the admin user that is generating the activation codes.

After the activation code generation process is initiated by clicking the generate button 670, the activation code generation window 660 may be closed and the company overview page 650 of FIG. 23 may be reactivated. The company overview page 650 may be refreshed so that the information provided in the activation code summary area 652 and the activation code list 656 is updated to reflect the generation of the new activation codes. Consequently, the number of activation codes generated and available in the area 652 and list 656 may increase, while the usage rate and number of activation codes to be generated may decrease.

Figure 25:
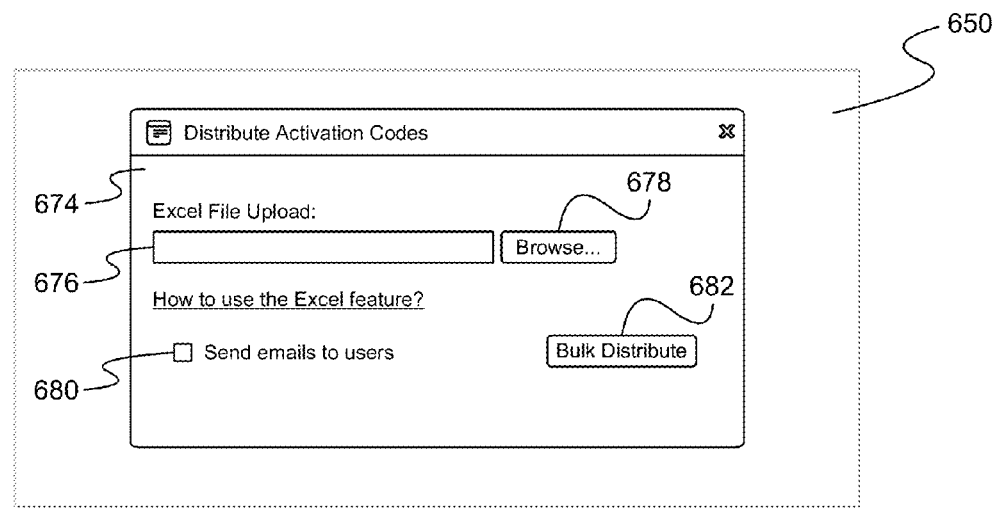
FIG. 25 is a portion of the company overview screen of FIG. 23 enlarged and with a distribute activation codes window displayed.

With the activation codes generated and available for assignment is to the employees of the company, the admin user may initiate an activation code distribution process by clicking on a distribute activation codes button 672 on the company overview page 650. In one embodiment where the activation codes were generated and downloaded to a data file, the distribute button 672 may cause a distribute activation codes window 674 to pop up as shown in FIG. 25. The window 674 may provide a data file name field 676 in which the admin user may specify a file path and filename for a data file containing the activation codes to be distributed to employees of the company. The data file may be an updated version of the data file downloaded during the activation code generation process, or a user generated data file, and may contain the activation codes to be distributed along with corresponding information for the employees to which the activation codes will be distributed, such as the employee's name, e-mail address, contact telephone number, job identification information, and the like. The admin user may type the path and file name in the data file name field 676, or may use a browse button 678 to use a directory to find a data file. If desired for notification purposes, the admin user may click on a checkbox 680 to have e-mails generated and distributed to the users identified in the data file with a notification of the activation code to which they have been assigned and instructions for accessing the travel risk management system 10.

After the data file is specified, the admin user may click on a bulk distribute button 682 of the distribute activation code window 674 to cause the administrative application to upload the designated data file to the business application server 30. The administrative application may cause the business application server 30 update the records stored at the database server 32 for each of the activation codes with the employee information from the file. If the e-mail check box 680 was checked by the admin user on the distribute activation code window 674, the business application server 30 may also format and transmit e-mail messages to all the employees in the data file containing the assigned activation code and any other information and instructions necessary for the employee to login to the travel risk management system 10, such as by entering the required information into the fields 402-412 of the mobile app application window 400 of FIG. 12 as described above.

Figure 26:
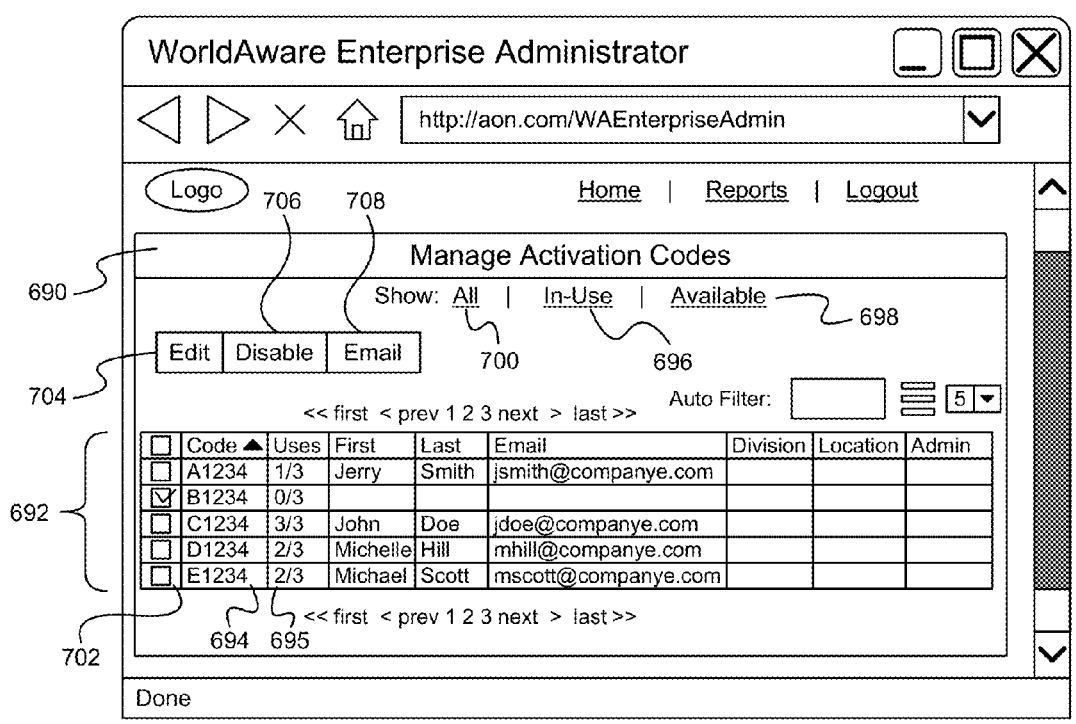
FIG. 26 is a manage activation codes page for an administrative application of the system of FIG. 1.

Use of a data file for the bulk assignment and distribution of the activation codes to company employees may be one mechanism for assigning generated activation codes to employees provided in the system 10. The administrative application may provide additional functionality for assigning and monitoring the activation codes for a company. The company overview page 650 of FIG. 23 may include a manage activation codes button 684 that may be clicked by the admin user to cause a manage activation codes page 690 such as that shown in FIG. 26 to be displayed. The manage activation codes page 690 may display a list 692 of the activation codes 694 that have been generated for the company, along with the identification information for employees that have been assigned to the various activation codes 694. As discussed above, the system 10 may limit the number of devices 26 on which the mobile app may be activated using an assigned activation code. The list 692 may include an activation code uses column 695 providing the number of actual uses of the activation code by the employee and the total number of uses allowed for the activation code. If the actual uses are less than the allowed uses, the employee can activate the mobile app on additional devices 26. If the actual uses equal the allowed uses, the employee has maxed out the number of devices on which the mobile app may be activated.

By default, the list 692 may include all of the activation codes generated for the company. The administrative application may also allow the admin user to view particular subsets of the activation code 694. The page 690 may provide an in-use button 696 that when clicked by the admin user may cause the list 692 to only display the activation codes that have been assigned to employees, and an available button 698 that may be clicked to show only the activation codes that do not have an assigned employee in the list 692. A show all button 700 may eliminate any filtering and again show all activation codes generated for the company in the list 692 when the button 700 is clicked. Additional filtering options may be provided for showing only activation codes of interest to the admin user in the list 692, such as filtering by application code number ranges, employee names and e-mail addresses, employee job description information, and the like as will be apparent to those skilled in the art.

The manage activation codes page 690 may allow the admin user to perform various management tasks on the displayed activation codes 694 for the company. When the admin user identifies an activation code 694 on which an action may be performed, the admin user may click on a corresponding checkbox 702 to select the activation code. Once selected, the admin user may click on an edit button 704 to allow the user to edit the information for the activation code either by activating the corresponding employee information fields in the list 692 for editing, or by opening an activation code edit window (not shown) that may provide editable fields for the information associated with the activation code. The admin user may update the information as necessary, which may include entering employee information for an activation code that was not previously assigned, or updating the employee information for a previously assigned activation code, and then click on a corresponding update button to cause the administrative application to have the business application server 30 update the information stored in the database server 32 for the activation code.

The manage activation codes window 690 may also provide the admin user with the ability to disable and re-enable one or more of the activation codes 694 to further manage employee access to the system 10. After selecting one or more activation codes 694 by clicking on the corresponding checkbox(es) of 702, the admin user may click a disable button 706 to cause the administrative application to update the status of selected activation code(s) 694 stored with the activation code record in the database server 32 to prevent the activation code from being used to access the system 10. The status may be shown in the list 692, and an additional enable button (not shown) may be provided on the page 690 to re-enable activation codes that may have previously been disabled. The page 690 may provide additional functionality for generating and transmitting e-mail messages to employees to which activation codes 694 have been assigned via an e-mail button 708 that may generate and transmit notification e-mail messages to employees in a similar manner as described above for the bulk distribution process using data files.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, not impossible. Numerous alternative embodiments could be implemented, using either current technology or technology developed after the filing date of this patent, which would still fall within the scope of the claims defining the invention.

What is claimed is:

1. A method for tracking a location of users of a travel risk management system during travel and notifying the users of travel risk, the method comprising the travel risk management system performing steps of:

storing input travel itinerary information for a user of the travel risk management system in a user travel database of the system, wherein the travel itinerary information includes user identification information, travel date information for the time period in which the user is traveling, and geographic location information for at least one destination of the user during the travel time period;

transmitting a location request message from an application server of the travel risk management system to a portable computing device of the user, when a current time is within the time period of the travel itinerary information in which the user is traveling;

receiving a location response message from the user's portable computing device at the application server, wherein information in the location response message includes the actual location of the user;

comparing the actual location of the user, as determined by receiving a location response message from the user's portable computing device at the application server, to an expected location of the user determined based on the stored travel itinerary information;

determining whether the actual location of the user is different than the expected location of the user from the travel itinerary information by comparing the actual location of the user to an expected location of the user determined based on the stored travel itinerary information;

updating the travel itinerary information with the actual location of the user in response to determining that the actual location of the user is different than the expected location of the user from the travel itinerary information;

storing on the system travel related information and travel risk information for a plurality of countries, the travel risk information including a current risk rating and a risk trend for each country;

providing a graphical interface to the user comprising a home page that provides access to the travel related information and the travel risk information;
determining an occurrence of a risk management event and a geographic location of the event;
determining by a risk management response routine whether the user is within an affected location of the event; and
transmitting by the risk management response routine a notification message to the user if the user is within the affected location of the event.

2. The method of claim 1, wherein inputting travel itinerary information comprises entering travel itinerary information at a computing device of the travel risk management system.

3. The method of claim 1, wherein inputting travel itinerary information comprises:
receiving travel itinerary information electronically at an application server of the travel risk management system from a source external to the travel risk management system; and
inputting the travel itinerary information from the external source into the user travel database.

4. A method for determining an actual location of a user of a travel risk management system and notifying the user of travel risk, the method comprising the travel risk management system performing steps of:
storing travel itinerary information for a user of the travel risk management system in a user location database of the travel risk management system, wherein the travel itinerary information includes user identification information, travel date information for the time period in which the user is traveling, and geographic location information for at least one destination of the user during the travel time period;
transmitting a location request message from an application server of the travel risk management system to a portable computing device of the user, when a current time is within the time period of the travel itinerary information in which the user is traveling;
receiving a location response message from the user's portable computing device at the application server, wherein the location response message contains user identification information and the actual location of the user;
comparing the actual location of the user, as determined by receiving a location response message from the user's portable computing device at the application server, to an expected location of the user determined based on the stored travel itinerary information;
determining whether the actual location of the user is different than the expected location of the user from the travel itinerary information by comparing the actual location of the user to an expected location of the user determined based on the stored travel itinerary information;
updating the stored travel itinerary information with the actual location of the user in response to determining that the actual location of the user is different than the expected location of the user from the travel itinerary information;
storing on the system travel related information and travel risk information for a plurality of countries, the travel risk information including a current risk rating and a risk trend for each country;
providing a graphical interface to the user comprising a home page that provides access to the travel related information and the travel risk information;
determining an occurrence of a risk management event and a geographic location of the event;
determining by a risk management response routine whether the user is within an affected location of the event; and
transmitting by the risk management response routine a notification message to the user if the user is within the affected location of the event.

5. The method of claim 4, wherein transmitting the location request message comprises transmitting the location request message to the user's portable computing device at periodic, scheduled intervals.

6. The method of claim 4, wherein each country is assigned a risk level value, and wherein updating the user location comprises:
determining a country in which the user is located based on the actual location of the user from the location response message;
determining whether the assigned risk level value for the country in which the user is located is a high risk level value; and
updating the user location of the user stored in the user location database with the actual location of the user from the location response message in response to determining that the assigned risk level value for the country in which the user is located is a high risk level value.

7. The method of claim 6, wherein updating the user location comprises:
determining a country in which the user is located based on the user location of the user stored in the user location database;
determining whether the assigned risk level value for the country determined based on the stored user location is a high risk level value; and
updating the user location of the user stored in the user location database with the actual location of the user from the location response message in response to determining that the assigned risk level value for the country in which the user is located is not a high risk level value and that the assigned risk level value for the country based on the stored user location is a high risk value.

8. A non-transitory computer readable medium with computer executable instructions for a portable computing device application of a travel risk management system, wherein a portable computing device on which the portable computing device application may be installed includes an input device and a memory, the computer executable instructions, when executed, causing the portable computing device to perform steps of:
receiving user activation information input at the input device of the portable computing device, wherein the user activation information includes user identification information and an activation code;
storing the user activation information in the memory of the portable computing device;
determining a current location of the portable computing device in response to the occurrence of a triggering event at the portable computing device;
formatting a current location message containing the user identification information and the current location of the portable computing device;
transmitting the location message from the portable computing device to an application server of the travel risk management system, when a current time is within the time period of the travel itinerary information in which the user is traveling, wherein the application server stores the travel itinerary information, which includes user identification information, travel date information for the time period in which the user is traveling, and geographic location information for at least one destination of the user during the travel time period;

comparing the actual location of the user, as determined by receiving a current location message from the user's portable computing device at the application server, to an expected location of the user determined based on the travel itinerary information stored on the application server;

updating the stored travel itinerary information on the application server with the actual location of the user in response to determining that the actual location of the user is different than the expected location of the user from the travel itinerary information;

storing on the portable computing device travel related information and travel risk information for a plurality of countries, the travel risk information including a current risk rating and a risk trend for each country;

providing a graphical interface to the user comprising a home page that provides access to the travel related information and the travel risk information; and receiving a notification message from the travel risk management system to the user if the user is within an affected location of a risk management event.

9. The non-transitory computer readable medium of claim 8, wherein the triggering event is the elapsing of a predetermined period of time since the previous occurrence of transmitting the location message from the portable computing device to an application server of the travel risk management system, and the computer readable instructions further comprise instructions for determining that the predetermined period of time has elapsed since the previous occurrence of transmitting the location message from the portable computing device to the application server.

10. The non-transitory computer readable medium of claim 8, wherein the triggering event is the start up of the portable computing device application on the device, and the computer readable instructions further comprise instruction for detecting the start up of the portable computing device application.

11. The non-transitory computer readable medium of claim 8, wherein the triggering event is the start up of the portable computing device, and the computer readable instructions further comprise instructions for detecting the start up of the portable computing device.

12. The non-transitory computer readable medium of claim 8, wherein the triggering event is the receipt of a location request message from the application server of the travel risk management system, and the computer readable instructions further comprise instructions for detecting the receipt of the location request message from the application server.

13. The non-transitory computer readable medium of claim 8, further comprising instructions for:

receiving travel itinerary information input at the input device of the portable computing device, wherein the travel itinerary information includes travel date information for the time period in which the user is traveling, and geographic location information for at least one destination of the user during the travel time period; and storing the travel itinerary information in the memory of the portable computing device.

14. The non-transitory computer readable medium of claim 13, wherein the triggering event is a current time being within the time period of the travel itinerary information in which the user is traveling, and the computer readable instructions further comprise instructions for determining that the current time is within the time period of the travel itinerary information in which the user is traveling.

15. The non-transitory computer readable medium of claim 8, wherein each country is assigned a risk level value, wherein the triggering event is the user being located within a country having an assigned risk level that is a high risk level value, and wherein the computer readable instructions further comprise instructions for:

determining a country in which the user is located based on the actual location of the user;

determining whether the assigned risk level value for the country in which the user is located is a high risk level value; and transmitting the location message from the portable computing device to the application server in response to determining that the assigned risk level value for the country in which the user is located is a high risk level value.

16. The non-transitory computer readable medium of claim 15, further comprising instructions for storing the assigned risk level values for the countries in the memory of the portable computing device; and retrieving the assigned risk level value for the country in which the user is located for use in determining whether the assigned risk level value is a high risk level value.

* * * * *

UNITED STATES PATENT AND TRADEMARK OFFICE
CERTIFICATE OF CORRECTION

PATENT NO. : 8,903,870 B2  
APPLICATION NO. : 13/337005  
DATED : December 2, 2014  
INVENTOR(S) : Douglas R. Turk et al.

Page 1 of 1

It is certified that error appears in the above-identified patent and that said Letters Patent is hereby corrected as shown below:

On the Title page, Item 75, "Long Aston (GB)" should read --"Long Ashton (GB)"--

In the Specification

Column 4, Line 47, "meaning" should read --"meaning."--

Signed and Sealed this
Eighth Day of September, 2015

Michelle K. Lee
*Director of the United States Patent and Trademark Office*